United States Patent [19]

Kabenjian

[11] Patent Number: 5,613,162
[45] Date of Patent: Mar. 18, 1997

[54] METHOD AND APPARATUS FOR PERFORMING EFFICIENT DIRECT MEMORY ACCESS DATA TRANSFERS

[75] Inventor: Gregory V. Kabenjian, Duarte, Calif.

[73] Assignee: AST Research, Inc., Irvine, Calif.

[21] Appl. No.: 368,474

[22] Filed: Jan. 4, 1995

[51] Int. Cl.$^6$ .................... G06F 13/00; G06F 13/28
[52] U.S. Cl. .................. 395/842; 395/843; 395/855; 395/872
[58] Field of Search .................. 395/842–848, 395/840–841, 849, 873, 877, 855, 859

[56] References Cited

U.S. PATENT DOCUMENTS

| | | | |
|---|---|---|---|
| 4,807,121 | 2/1989 | Halford | 364/200 |
| 4,868,734 | 9/1989 | Idleman et al. | 395/877 |
| 4,956,768 | 9/1990 | Sidi et al. | 395/873 |
| 5,097,437 | 3/1992 | Larson | 395/775 |
| 5,111,425 | 5/1992 | Takeuchi et al. | 395/842 |
| 5,179,709 | 1/1993 | Bailey et al. | 395/843 |
| 5,187,779 | 2/1993 | Jeddeloh et al. | 395/325 |
| 5,187,783 | 2/1993 | Mansfied et al. | 395/425 |
| 5,255,374 | 10/1993 | Alderequia et al. | 395/293 |
| 5,287,471 | 2/1994 | Katayose et al. | 395/842 |
| 5,297,242 | 3/1994 | Miki | 395/842 |
| 5,375,218 | 12/1994 | Umeda | 395/842 |
| 5,386,532 | 1/1995 | Sodos | 395/842 |
| 5,448,701 | 9/1995 | Metz, Jr. et al. | 395/873 |
| 5,497,501 | 3/1996 | Kohzono et al. | 395/842 |

Primary Examiner—Jack B. Harvey
Assistant Examiner—Ario Etienne
Attorney, Agent, or Firm—Knobbe, Martens Oloson & Bear LLP

[57] ABSTRACT

A method and apparatus provide a direct memory access (DMA) system that transfers data between a memory in a computer system and a plurality of I/O devices. The DMA system includes at least two channels which operate independently and in an interleaved manner so that multiple DMA transfers can occur concurrently. Each channel includes a pair of buffers so that data can be transferred between one buffer and memory at a rate determined by the memory and data can be transferred between the other buffer and the I/O device at a rate determined by the I/O device. Transfers between the two buffers occur at a data rate determined by the bus connecting the two buffers. Thus, the transfers between the two buffers occur in bursts to optimize the transfer and to reduce the amount of time that the bus is needed for the transfer. Therefore, the bus is available for transfers by the other DMA channel and by other devices on the bus.

12 Claims, 12 Drawing Sheets

METHOD AND APPARATUS FOR PERFORMING EFFICIENT DIRECT MEMORY ACCESS DATA TRANSFERS

BACKGROUND OF THE INVENTION

1. Field of the Invention

The present invention pertains to the field of control units for implementing direct memory access (DMA) techniques. In particular, the present invention pertains to a DMA unit that can be programmed to optimize the DMA interface, based on the characteristics and configuration of the memory and input/output (I/O) devices of a computer system.

2. Description of the Related Art

In a microprocessor-based computer system, a DMA controller can facilitate the transfer of data between an I/O device and a memory unit, without the direct control of the central processing unit (CPU). Data can either be transferred from memory to an I/O device (a memory source transfer) or from an I/O device to memory (a memory destination transfer). Data can also be transferred between two memory units, but, in that situation, one of the memory units is considered an I/O device for purposes of the present description. DMA transfers typically involve the transfer of one or more blocks of data, as data transfers of only a few bytes of data are often performed more efficiently under the direct control of the CPU.

A DMA transfer is typically accomplished in the following manner. First, the CPU initializes both the DMA controller and the I/O device by indicating, for example, a source address, a destination address, and the amount of data to be transferred. Next, the DMA controller generates address and control signals to control the system I/O bus to perform successive data transfers until all of the requested data have been transferred from the source to the destination. During the successive data transfers the source responds to the address and control signals generated by the DMA controller to transmit the requested data, and the destination responds to the address and control signals generated by the DMA controller to receive the data. After the DMA transfer is complete, the DMA controller may notify the CPU of this condition by activating an interrupt, or, alternatively, the CPU may poll the DMA controller to determine when the DMA transfer is complete.

If two addresses must be generated on the same bus to complete a data transfer, the DMA controller typically performs two consecutive bus cycles. In the first cycle, the DMA controller generates the appropriate source address, and data are transferred from the source to the DMA controller. In the second cycle, the DMA controller generates the appropriate destination address, and data are transferred from the DMA controller to the destination. The DMA controller buffers the data between the two bus cycles.

DMA transfers can significantly improve system performance because the CPU is able to perform other functions while the data transfers are occurring. However, existing DMA controllers are not efficient in their use of either memory buses or I/O buses. The rate of DMA transfers is generally limited by relatively slow I/O devices. While the DMA controller and the memory are waiting for the I/O device to complete a data transfer, the memory bus is often tied up, preventing the CPU from performing other memory accesses, and the I/O bus is often tied up, preventing various other I/O transfers.

SUMMARY OF THE INVENTION

One aspect of the present invention is a direct memory access (DMA) controller for a computer system having a memory coupled to a high speed memory bus and having an I/O device coupled to an I/O bus. The DMA controller comprises a first set of independently programmable DMA control registers which identify a first source, a first destination and a first quantity of data to be transferred between the memory and the I/O device via the I/O bus. The first set of DMA control registers are selectable to control a first transfer of data between the memory and the I/O device. The DMA controller also includes a second set of independently programmable DMA control registers which identify a second source, a second destination and a second quantity of data to be transferred between the memory and the I/O device via the I/O bus. The second set of DMA control registers are selectable to control a second transfer of data between the memory and the I/O device. The DMA controller further includes a set of device parameter registers which are programmable to specify the data transfer characteristics of the I/O device. The registers in the second set of DMA control registers are programmable while the registers in the first set of DMA control registers are selected to control the first transfer of data between the memory and the I/O device. The second set of DMA control registers are selectable as soon as the first transfer of data is complete to control the second transfer of data between the memory and the I/O device.

Another aspect of the present invention is a direct memory access (DMA) system for a computer system having a memory coupled to a high speed memory bus and having an I/O device coupled to an I/O bus. The DMA system comprises a first data buffer which transfers data to and from the memory at a first data rate of the high speed memory bus and a second data buffer which transfers data to and from the I/O device at a second data rate of the I/O device. A DMA controller controls transfers of data between the first data buffer and the second data buffer via the I/O bus. The DMA controller transfers data between the first data buffer and the second data buffer as bursts of data at a high data rate and then releases the I/O bus while data is transferred between second data buffer and the I/O device at the second data rate.

Another aspect of the present invention is a method for performing a direct memory access data transfer from a memory device to a second device in a microprocessor-based computer system. The method comprises the steps of transferring data from the memory device into a first data buffer until the first data buffer is full or until all of the data for the data transfer has been transferred from the memory device to the first data buffer. The method further includes the step of transferring data from the first data buffer to a second data buffer associated with the second device until the second data buffer is full. The method also includes the step of repeatedly performing a sequence of steps until all of the data for the data transfer has been transferred to the second device. The sequence of steps includes transferring data from the memory device into the first data buffer until the first data buffer is full or until all of the data for the data transfer has been transferred from the memory device to the first data buffer; waiting until a predetermined number of data bytes has been read from the second data buffer of the second device; and transferring data from the first data buffer to the second data buffer until the second data buffer is full or until all of the data for the data transfer has been transferred to the second data buffer.

An additional aspect of the present invention is a method for performing a direct memory access data transfer to a memory device from a second device in a microprocessor-based computer system. The method comprises the steps of transferring data from the second device to a first data buffer associated with the second device; waiting until a predetermined number of data bytes has been written into the first data buffer; transferring data from the first data buffer to a second data buffer until the second data buffer is full or until all of the data for the data transfer has been transferred from the second device; transferring data from the second data buffer to the memory device until the second data buffer is empty; and then repeatedly performing a sequence of steps until all of the data for the data transfer has been transferred to the memory device. The sequence of steps comprises waiting until the predetermined number of data bytes has been written into the first data buffer from the second device; transferring data from the first data buffer to the second data buffer until the second data buffer is full or until all of the data for the data transfer has been transferred from the second device; and transferring data from the second data buffer to the memory device until the second data buffer is empty.

A further aspect of the present invention is a direct memory access (DMA) system for a computer system having a memory, an I/O interface and a plurality of I/O devices. The DMA system comprises a DMA controller connected between the memory and the I/O interface and a DMA buffer connected between the memory and the I/O interface. The DMA controller comprises a first set of DMA control registers which control transfers of data between the memory and a first I/O device of the plurality of I/O devices. Preferably, the first set of DMA control registers comprise a plurality of control registers which include a first register which selects a first source of data to be transferred, a second register which selects a first destination for the data to be transferred and a third register which selects a first amount of data to be transferred. The DMA controller also comprises a second set of DMA control registers which control transfers of data between the memory and a second I/O device of the plurality of I/O devices. Preferably, the second set of DMA control registers comprise a plurality of control registers which include a fourth register which selects a second source of data to be transferred, a fifth register which selects a second destination for the data to be transferred and a sixth register which selects a second amount of data to be transferred. The DMA buffer comprises a first data buffer which temporarily stores the data to be transferred between the memory and the first I/O device, and a second data buffer which temporarily stores the data to be transferred between the memory and the second I/O device. The DMA controller controls the first set of DMA control registers and the first data buffer independently of the second set of DMA control registers and the second data buffer so that data transferred between the memory and the first I/O device is interleaved with data transferred between the memory and the second I/O device.

DETAILED DESCRIPTION OF THE PREFERRED EMBODIMENT

Figure 1:
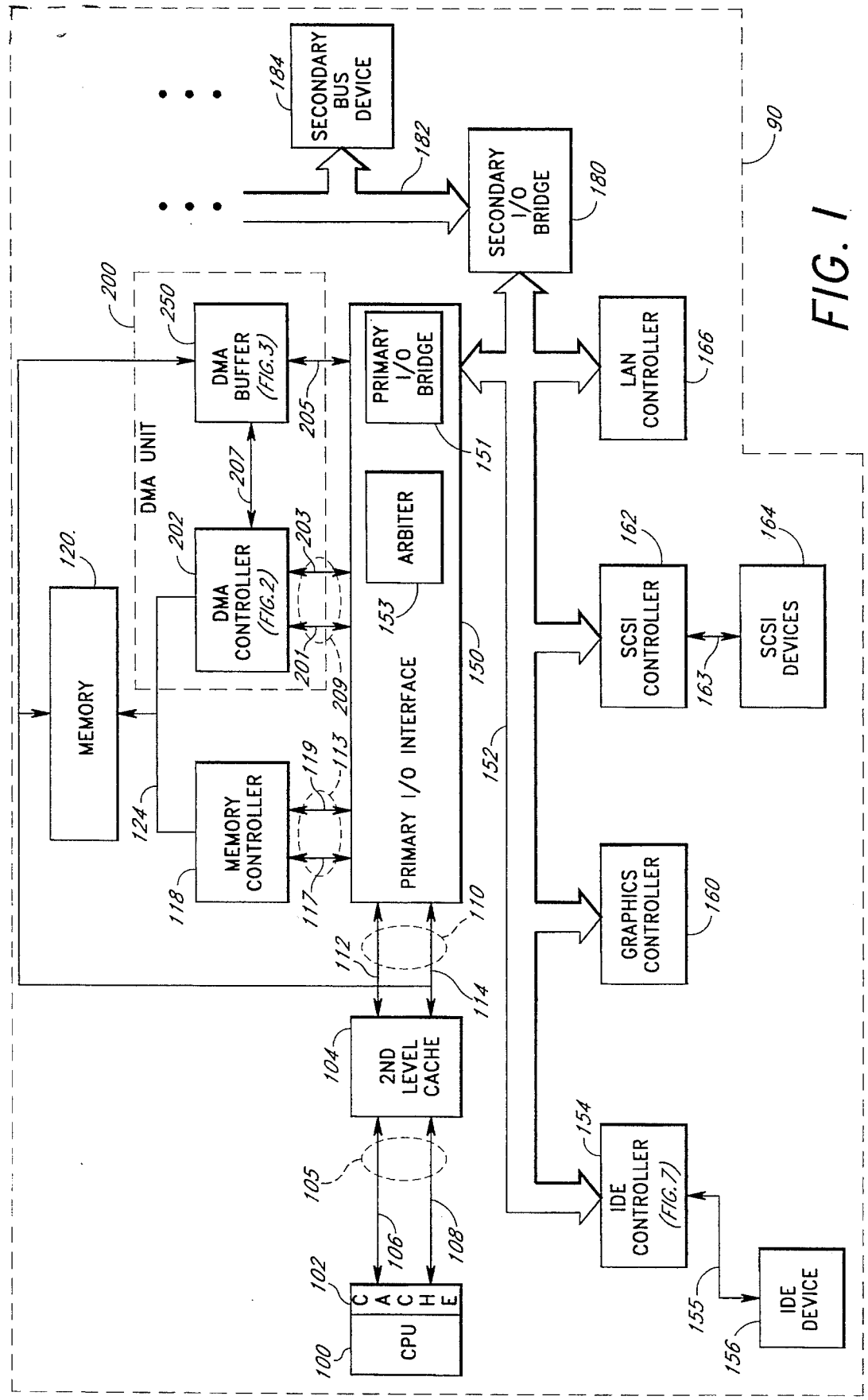
FIG. 1 is a functional block diagram of a computer architecture for a personal computer incorporating a DMA unit, a primary I/O interface, and an integrated drive electronics (IDE) controller of the preferred embodiment of the present invention.

FIG. 1 is a functional block diagram illustrating the architecture of a microprocessor-based computer system 90. The computer system 90 is used as an example to describe the preferred embodiment of the DMA unit of the present invention. The DMA unit of the present invention can also be incorporated into many other computer architectures through modifications that will be understood to a person of skill in the art.

The computer system 90 comprises a CPU 100, a second level cache 104, a memory controller 118, a memory unit 120, a primary I/O interface 150, an IDE controller 154, an IDE device 156, a graphics controller 160, a Small Computer System Interface (SCSI) controller 162, one or more SCSI devices 164, a local area network (LAN) controller 166, a secondary I/O bridge 180, one or more secondary bus devices 184, and a DMA unit 200. The CPU 100 comprises an internal cache 102. The primary I/O interface 150 comprises a primary I/O bridge 151 and an arbiter 153. The DMA unit 200 comprises a DMA controller 202 and a DMA buffer 250.

The CPU 100 is connected to the second level cache 104 by a CPU bus 105. The CPU bus 105 comprises a CPU address/control bus 106 and a CPU data bus 108. The second level cache 104 is connected to the primary I/O interface 150 by a memory bus 110. The memory bus 110 comprises a memory address/control bus 112 and a memory data bus 114. The memory data bus 114 is also connected to the memory unit 120 and the DMA buffer 250. The memory controller 118 is connected to the primary I/O interface 150 by a memory controller bus 113. The memory controller bus 113 comprises a memory controller address/control bus 117 and a memory controller data bus 119. The DMA controller 202 is connected to the primary I/O interface 150 by a DMA controller bus 209. The DMA controller bus 209 comprises a DMA controller address/control bus 201 and a DMA controller data bus 203. The memory controller 118 and the DMA controller 202 are connected to the memory unit 120 by a memory access bus 124. The DMA controller 202 is connected to the DMA buffer 250 by a DMA control bus 207. The DMA buffer 250 is connected to the primary I/O interface 150 by a DMA data bus 205.

The primary I/O interface 150 is connected to the secondary I/O bridge 180 by a primary I/O bus 152. The primary I/O bus 152 may comprise a peripheral controller interface (PCI) or a Video Electronics Standards Association (VESA) local bus, for example. The primary I/O bus 152 is also connected to the IDE controller 154, the graphics controller 160, the SCSI controller 162, and the LAN controller 166. The IDE controller 154 is connected to the IDE device 156 by an IDE bus 155. The SCSI controller 162 is connected to the SCSI device 164 by a SCSI bus 163. The secondary I/O bridge 180 is connected to the secondary bus device 184 by a secondary I/O bus 182. The secondary I/O bus 182 may comprise an industry standard architecture (ISA) or an extended industry standard architecture (EISA) bus, for example.

Many of the devices and buses in the computer system 90 are conventional and are well understood by those of skill in the art. The present description of the preferred embodiment focuses on the differences between a conventional prior art computer system and a computer system 90 implementing the present invention. Aspects of the computer system 90 that are not described in detail herein will be fully understood by those of skill in the art, based on the teachings of known conventional computer systems and the teachings of the present invention. A person of skill in the art will understand how to adapt a conventional computer system to implement the present invention.

The architecture of the computer system 90 provides numerous paths for data flow between the various devices in the computer system 90. These data paths are generally well understood by those of skill in the art. The CPU 100 communicates directly with the second level cache 104 using the CPU bus 105. The CPU 100 communicates with the memory controller 118 through the second level cache 104 and the primary I/O interface 150 using the CPU bus 105, the memory bus 110, and the memory controller bus 113. The CPU 100 communicates with the DMA controller 202 through the second level cache 104 and the primary I/O interface 150 using the CPU bus 105, the memory bus 110, and the DMA controller bus 209. The CPU 100 communicates with the memory unit 120 through the second level cache 104, the primary I/O interface 150, and the memory controller 118 using the CPU bus 105, the memory bus 110, the memory controller bus 113, and the memory access bus 124. The memory controller 118 generates address and control signals to the memory unit 120 to facilitate the communication between the CPU 100 and the memory unit 120. The CPU 100 communicates with devices on the primary I/O bus 152, such as the graphics controller 160, through the second level cache 104 and the primary I/O interface 150 using the CPU bus 105, the memory bus 110, and the primary I/O bus 152. The CPU 100 communicates with the secondary bus devices 184 through the second level cache 104, the primary I/O interface 150, and the secondary I/O bridge 180 using the CPU bus 105, the memory bus 110, the primary I/O bus 152, and the secondary I/O bus 182.

Data can be transferred between the memory unit 120 and devices on the primary I/O bus 152, such as the graphics controller 160, through the memory controller 118 and the primary I/O interface 150 using the memory access bus 124, the memory controller bus 113, the memory bus 110, and the primary I/O bus 152. These data transfers can be controlled by any of three different units. In each of these cases, the memory controller 118 generates address and control signals to control the operation of the memory unit 120. First, a conventional DMA transfer can be accomplished in this manner if the graphics controller 160 is associated with a conventional DMA controller. In this case the conventional DMA controller controls the data transfer using the memory controller 118. Second, the CPU 100 can control the data transfer. Third, the device on the primary I/O bus 152 can control the data transfer by becoming a bus master. Data can also be transferred between the memory unit 120 and the secondary bus devices 184 through the memory controller 118, the primary I/O interface 150, and the secondary I/O bridge 180 using the memory access bus 124, the memory controller bus 113, the memory bus 110, the primary I/O bus 152, and the secondary I/O bus 182. These data transfers can be controlled by a conventional DMA controller, by the CPU 100, or by the secondary bus device 184 acting as a bus master. The memory controller 118 generates address and control signals to control the operation of the memory unit 120.

Data can also be transferred between the memory unit 120 and a device on the primary I/O bus 152, such as the graphics controller 160, through the DMA unit 200 and the primary I/O interface 150 using the memory access bus 124, the memory data bus 114, the DMA controller bus 209, the DMA data bus 205, and the primary I/O bus 152. In this case the DMA controller 202 controls the data transfer and generates address and control signals to control the operation of the memory unit 120. Data can also be transferred between the memory unit 120 and the secondary bus devices 184 through the DMA unit 200, the primary I/O interface 150, and the second I/O bridge 180 using the memory access bus 124, the memory data bus 114, the DMA controller bus 209, the DMA data bus 205, the primary I/O bus 152, and the second I/O bus 182. The DMA controller 202 controls the data transfer and the operation of the memory unit 120.

The architecture of the computer system 90 can also be implemented to allow data transfers between a first device on the primary I/O bus 152, such as the LAN controller 166 and a second device on the primary I/O bus 152, such as the graphics controller 160, using the primary I/O bus 152. Similarly, the architecture of the computer system 90 can be implemented to allow data transfers between different secondary bus devices 184 using the secondary I/O bus 182. The architecture of the computer system 90 can also be implemented to allow a transfer of data between a device on the primary I/O bus 152, such as the graphics controller 160, and a secondary bus device 184, through the secondary I/O bridge 180 using the primary I/O bus 152 and the secondary I/O bus 182.

A person of skill in the art will understand from the foregoing description of possible data transfers that a device controls a data transfer by generating address signals and control signals at the appropriate times and voltage levels, as required by the respective buses. For example, the DMA controller 202 may generate a write signal, address signals, and other control signals according to the PCI specification to control a write cycle across the primary I/O bus 152. A person of skill in the art will also understand that the primary I/O interface 150 and the secondary I/O bridge 180 generate address and control signals on one bus, according to its required format, in response to address and control signals received on another bus, according to its required format. For example, if the above-described write cycle generated by the DMA controller 202 is intended for one of the secondary bus devices 184, the secondary I/O bridge 180 may translate the signals on the primary I/O bus 152 from PCI format into EISA format on the secondary I/O bus 182. The primary I/O interface 150 and the secondary I/O bridge 180 may simply buffer received signals in some cases, or they may adjust the timing or voltage levels of the received signals to generate the corresponding signals in other cases.

The CPU bus 105, the memory bus 110, the primary I/O bus 152, and the secondary I/O bus 182 can operate independently so that various combinations of the above-described data transfers can occur simultaneously. For example, an access of the memory unit 120 by the CPU 100 over the CPU bus 105 and the memory bus 110 can occur simultaneously with a data transfer between the DMA unit 200 and a device on the primary I/O bus 152, using the primary I/O bus 152.

When a device, such as the CPU 100, needs to access another device in the computer system 90, the first device must first request control of the buses required to complete the access. The arbiter 153 of the primary I/O interface 150 controls access to both the memory bus 110 and the primary I/O bus 152. The secondary I/O bridge 180 controls access to the secondary I/O bus 182. Thus, if the CPU 100 needs to access the memory unit 120, the CPU 100 must first request control of the memory bus 110 from the arbiter 153. If the arbiter 153 grants the CPU 100 access to the memory bus 110, the CPU 100 can then access the memory unit 120, as required. As another example, if the CPU 100 needs to transfer data to or from a device on the primary I/O bus 152, such as the graphics controller 160, the CPU 100 must first request control of both the memory bus 110 and the primary I/O bus 152 from the arbiter 153. The arbiter 153 arbitrates between the CPU 100, the DMA unit 200, conventional DMA units in the system, and devices that can act as bus masters from the primary I/O bus 152 or the secondary I/O bus 182 for control of both the memory bus 110 and the primary I/O bus 152. The arbiter 153 can implement any of various arbitration techniques, as are well understood by a person of skill in the art.

Figure 2:
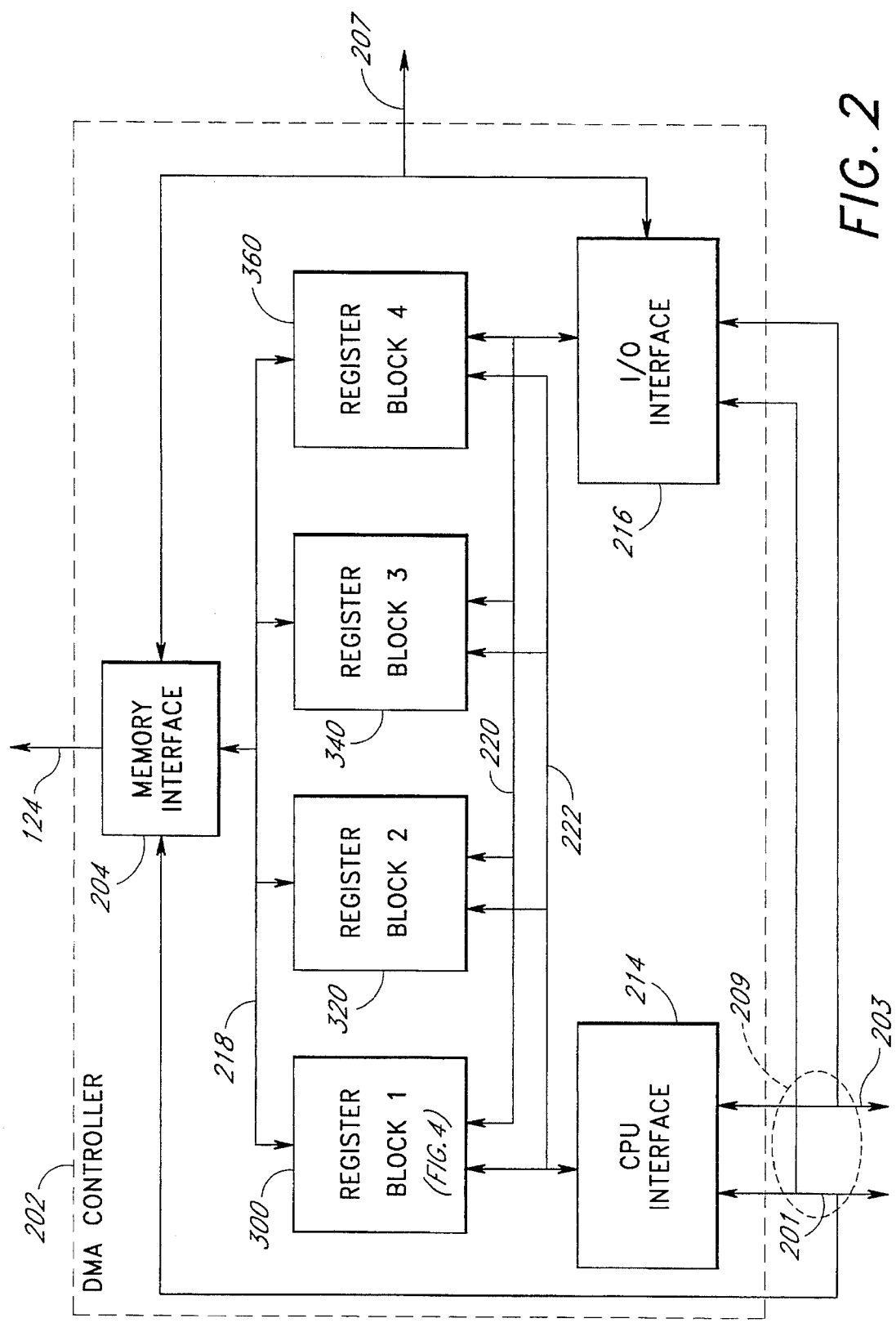
FIG. 2 is a functional block diagram of the DMA controller of the DMA unit of FIG. 1.

FIG. 2 illustrates a functional block diagram of the DMA controller 202. The DMA controller 202 comprises a memory interface 204, a CPU interface 214, an I/O interface 216, a first register block 300, a second register block 320, a third register block 340, and a fourth register block 360. The memory interface 204 is connected to the memory unit 120 by the memory access bus 124. The CPU interface 214 and the I/O interface 216 are connected to the primary I/O interface 150 by the DMA controller bus 209. The memory interface 204 is connected to the primary I/O interface 150 (FIG. 1) by the DMA controller address/control bus 201. The memory interface 204 and the I/O interface 216 are connected to the DMA buffer 250 by the DMA control bus 207. The memory interface 204 is connected to the register blocks 300, 320, 340, and 360 by a memory interface bus 218. The CPU interface 214 is connected to the register blocks 300, 320, 340, and 360 by a CPU interface bus 222. The I/O interface 216 is connected to the register blocks 300, 320, 340, and 360 by an I/O interface bus 220.

Figure 3:
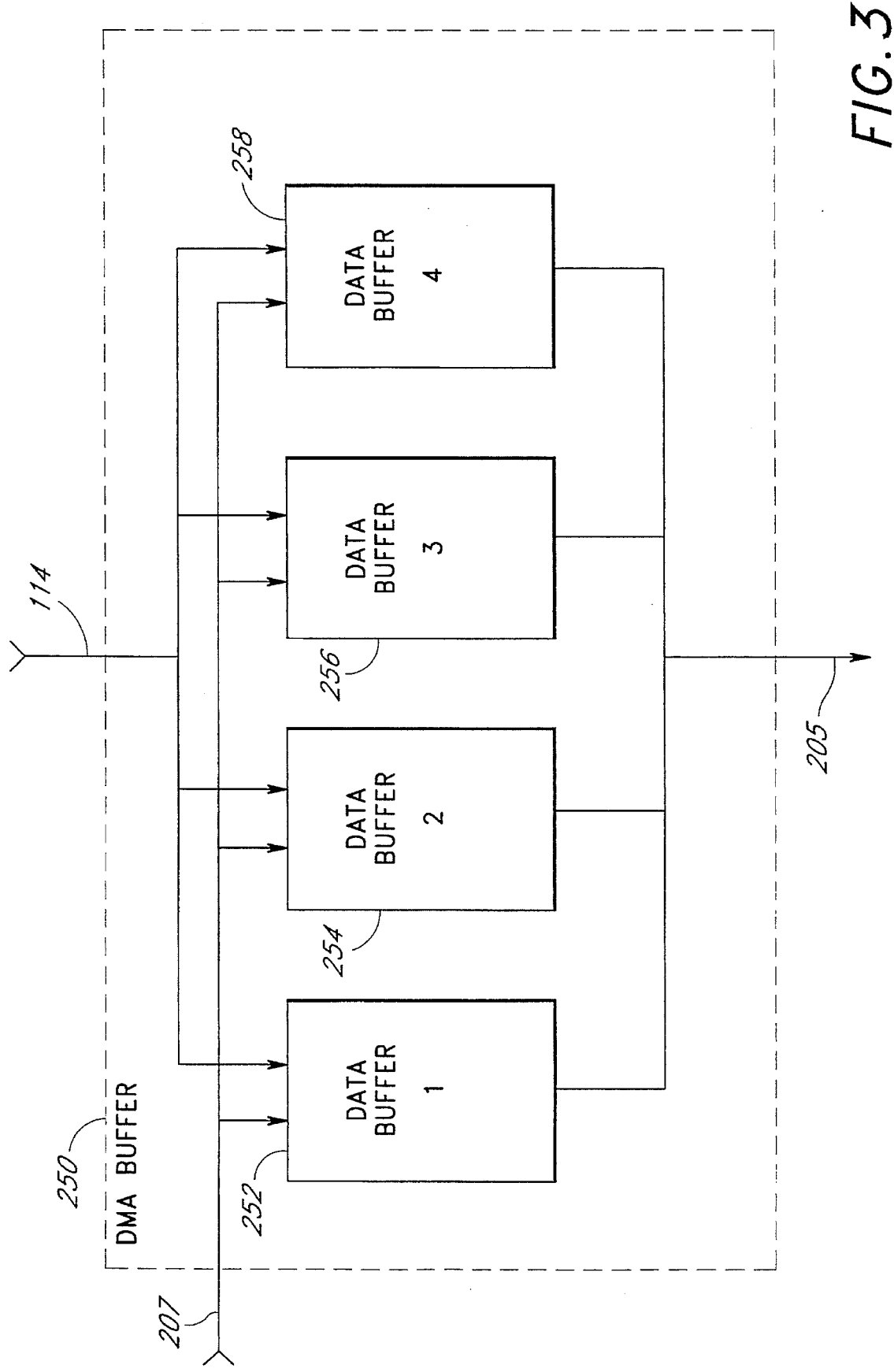
FIG. 3 is a functional block diagram of the DMA buffer of the DMA unit of FIG. 1.

FIG. 3 illustrates a functional block diagram of the DMA buffer 250. The DMA buffer 250 comprises a first data buffer 252, a second data buffer 254, a third data buffer 256, and a fourth data buffer 258. In the preferred embodiment, each of the data buffers 252, 254, 256, and 258 comprises a first-in-first-out (FIFO) 32-byte data buffer, although data buffers having various other capacities may also be used. The data buffers 252, 254, 256, and 258 are connected to the memory unit 120 by the memory data bus 114. The data buffers 252, 254, 256, and 258 are connected to the memory interface 204 and the I/O interface 216 by the DMA control bus 207. The data buffers 252, 254, 256, and 258 are connected to the primary I/O interface 150 by the DMA data bus 205.

Figure 4:
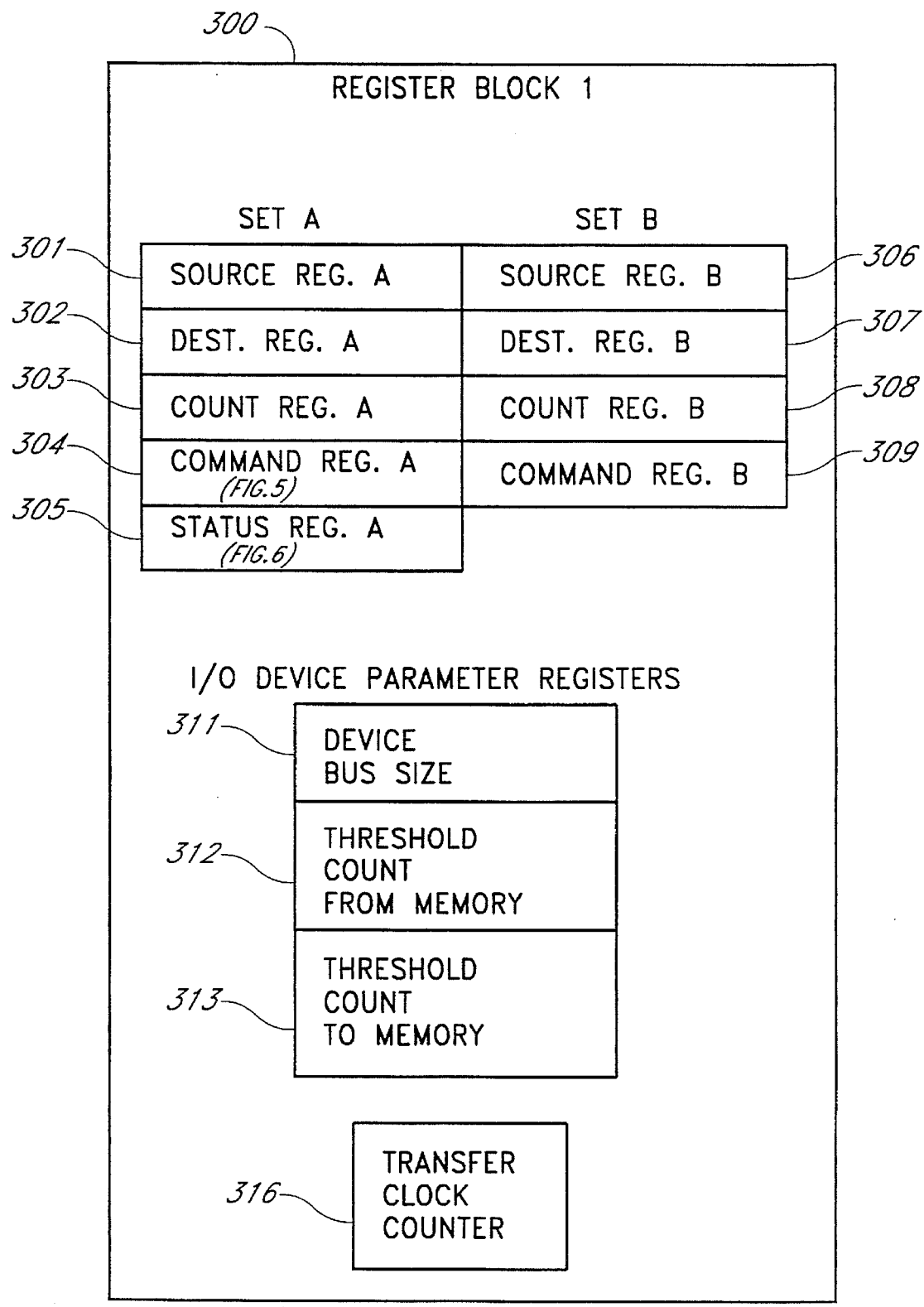
FIG. 4 is a functional block diagram of a register block of the DMA controller of FIGS. 1 and 2.

FIG. 4 illustrates a functional block diagram of the first register block 300 of the DMA controller 202. The register blocks 320, 340, and 360 have the same structure as the register block 300. The first register block 300 comprises a register set A, a register set B, and a set of I/O device parameter registers. The register set A comprises a source address register A (SOURCE REG. A) 301, a destination address register A (DEST. REG. A) 302, a count register A (COUNT REG. A) 303, a command register A (COMMAND REG. A) 304, and a status register A (STATUS REG. A) 305. The register set B comprises a source register B (SOURCE REG. B) 306, a destination register B (DEST. REG. B) 307, a count register B (COUNT REG. B) 308, and a command register B (COMMAND REG. B) 309. The I/O device parameter registers comprise a device bus size register 311, a threshold count from memory register 312, a threshold count to memory register 313 and a transfer clock counter 316.

Figures 5, 6:
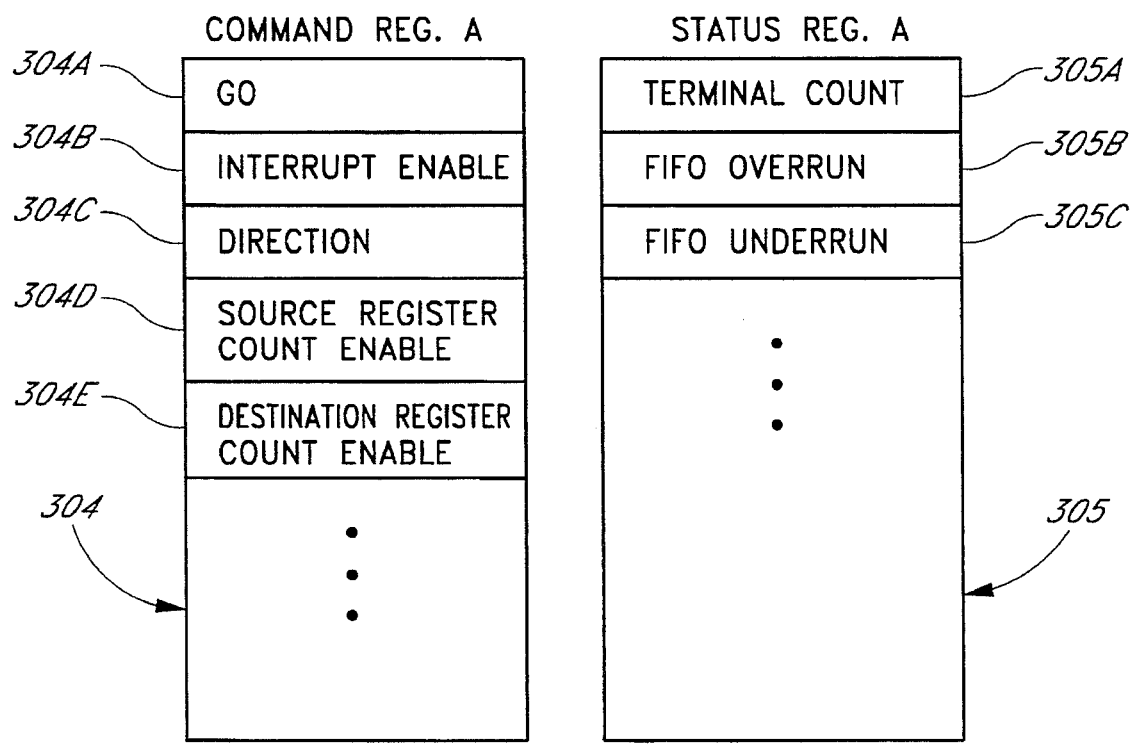
FIG. 5 is a register definition diagram of a command register of the register block of FIG. 4.
FIG. 6 is a register definition diagram of a status register of the register block of FIG. 4.

FIG. 5 illustrates a register definition diagram of the command register A 304 of the first register block 300. The command register B 309 has the same structure as the command register A 304. The command register A 304 comprises a go bit 304A, an interrupt enable bit 304B, a direction bit 304C, a source register count enable bit 304D and a destination register count enable bit 304E. The interrupt enable bit 304B indicates whether the DMA controller 202 is to interrupt the CPU 100 when the DMA transfer is complete. The direction bit 304C indicates whether the DMA transfer is a memory source transfer or a memory destination transfer. When the source register count enable bit 304D is set, the source address register 301 in FIG. 4 will increment once for each byte of data transferred. When the destination register count enable bit 304E is set, the destination address register 302 in FIG. 4 will increment once for each byte of data transferred.

FIG. 6 illustrates a register definition diagram of the status register A 305 of the first register block 300. The status register A 305 comprises a terminal count bit 305A, a FIFO overrun bit 305B, and a FIFO underrun bit 305C. The FIFO overrun bit 305B and the FIFO underrun bit 305C indicate conventional FIFO overrun and underrun errors respectively.

The DMA unit 200 of the preferred embodiment has four independent DMA channels. A first DMA channel comprises the first register block 300 and the first data buffer 252. A second DMA channel comprises the second register block 320 and the second data buffer 254. A third DMA channel comprises the third register block 340 and the third data buffer 256. A fourth DMA channel comprises the fourth register block 360 and the fourth data buffer 258. Each DMA channel in the DMA unit 200 is preferably used for DMA transfers with a particular I/O device or a particular group of I/O devices. For example, the first DMA channel may be used with the IDE controller 154, the second DMA channel may be used with the graphics controller 160, the third DMA channel may be used with the SCSI controller 162, and the fourth DMA channel may be used with the LAN controller 166. When assigning the different I/O devices to particular DMA channels within the DMA unit 200, the I/O devices are preferably grouped according to their data transfer characteristics. Each DMA channel within the DMA unit 200 is then programmed to optimize the DMA transfer with the I/O devices assigned to the particular DMA channel, based on the data transfer characteristics of the I/O devices. A DMA channel within the DMA unit 200 is programmed by writing appropriate values into the I/O device parameter registers within the corresponding register block 300, 320, 340, or 360.

Figure 7:
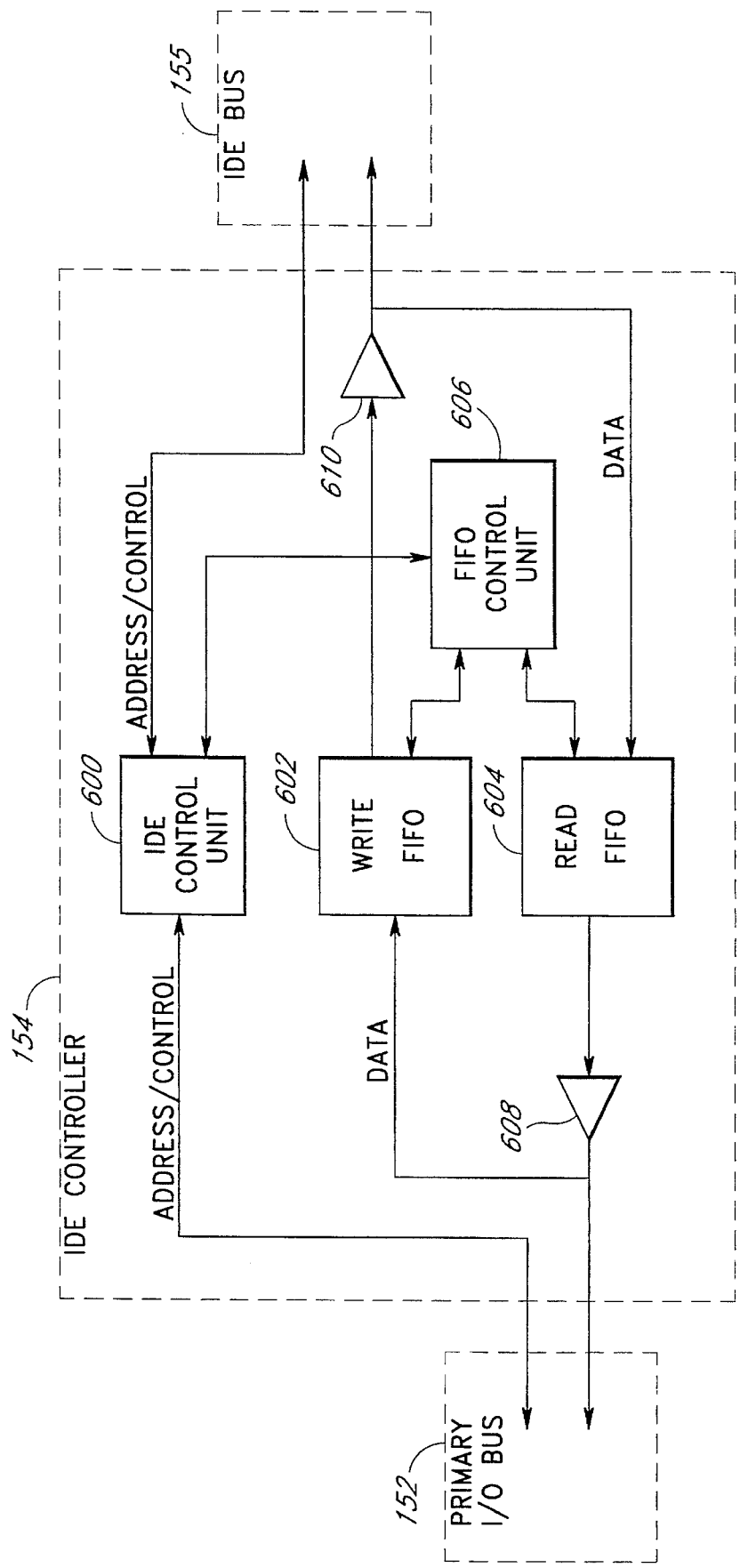
FIG. 7 is a functional block diagram of the IDE controller of FIG. 1.

FIG. 7 is a functional block diagram of the preferred IDE controller 154 of the present invention. The structure and function of other I/O devices on the primary bus 152, such as the graphics controller 160, the SCSI controller 162, and the LAN controller 166, and the structure and function of the secondary bus devices 184 may be similar to the structure and function of the IDE controller 154. The IDE controller 154 comprises an IDE control unit 600, a write FIFO 602, a read FIFO 604, a FIFO control unit 606, a primary I/O buffer 608, and an IDE buffer 610. The IDE control unit 600, the write FIFO 602, and the primary I/O buffer 608 are connected to the primary I/O bus 152. The IDE control unit 600, the IDE buffer 610, and the read FIFO 604 are connected to the IDE bus 155. The primary I/O buffer 608 is also connected to the read FIFO 604. The IDE buffer 610 is also connected to the write FIFO 602. The FIFO control unit 606 is connected to the IDE control unit 600, the write FIFO 602, and the read FIFO 604.

When a write cycle on the primary I/O bus 152 is addressed to the IDE controller 154, the data are transferred from the primary I/O bus 152 into the write FIFO 602. Subsequent write cycles may transfer additional data into the write FIFO 602. The data in the write FIFO 602 are subsequently transferred to the IDE bus 155 to be communicated to the IDE device 156. When a read cycle on the primary I/O bus 152 is addressed to the IDE controller 154, the data must first be transferred from the IDE bus 155 into the read FIFO 604. Additional cycles on the IDE bus 155 may be performed to transfer additional data into the read FIFO 604. The data in the read FIFO 604 are subsequently transferred to the primary I/O bus 152 to be transferred to the appropriate destination. The IDE bus 155 is a 16 bit bus, so that, generally, 16 bits of data are read from the write FIFO 602 or written to the read FIFO 604 during each cycle of the IDE bus 155. In the preferred embodiment, the data transfers at the primary I/O bus 152 may be 8 bits, 16 bits, or 32 bits. In other embodiments, the data transfers may be 64 bits or greater. The IDE control unit 600 generates address and control signals to control the transferring of data from the primary I/O bus 152 to the IDE bus 155, through the write FIFO 602, and from the IDE bus 155 to the primary I/O bus 152, through the read FIFO 604. The FIFO control unit 606 indicates the status of the write FIFO 602 and the read FIFO 604 to the IDE control unit 600. For example, the FIFO control unit 606 indicates whether the write FIFO 602 or the read FIFO 604 is empty or full.

Figure 8A:
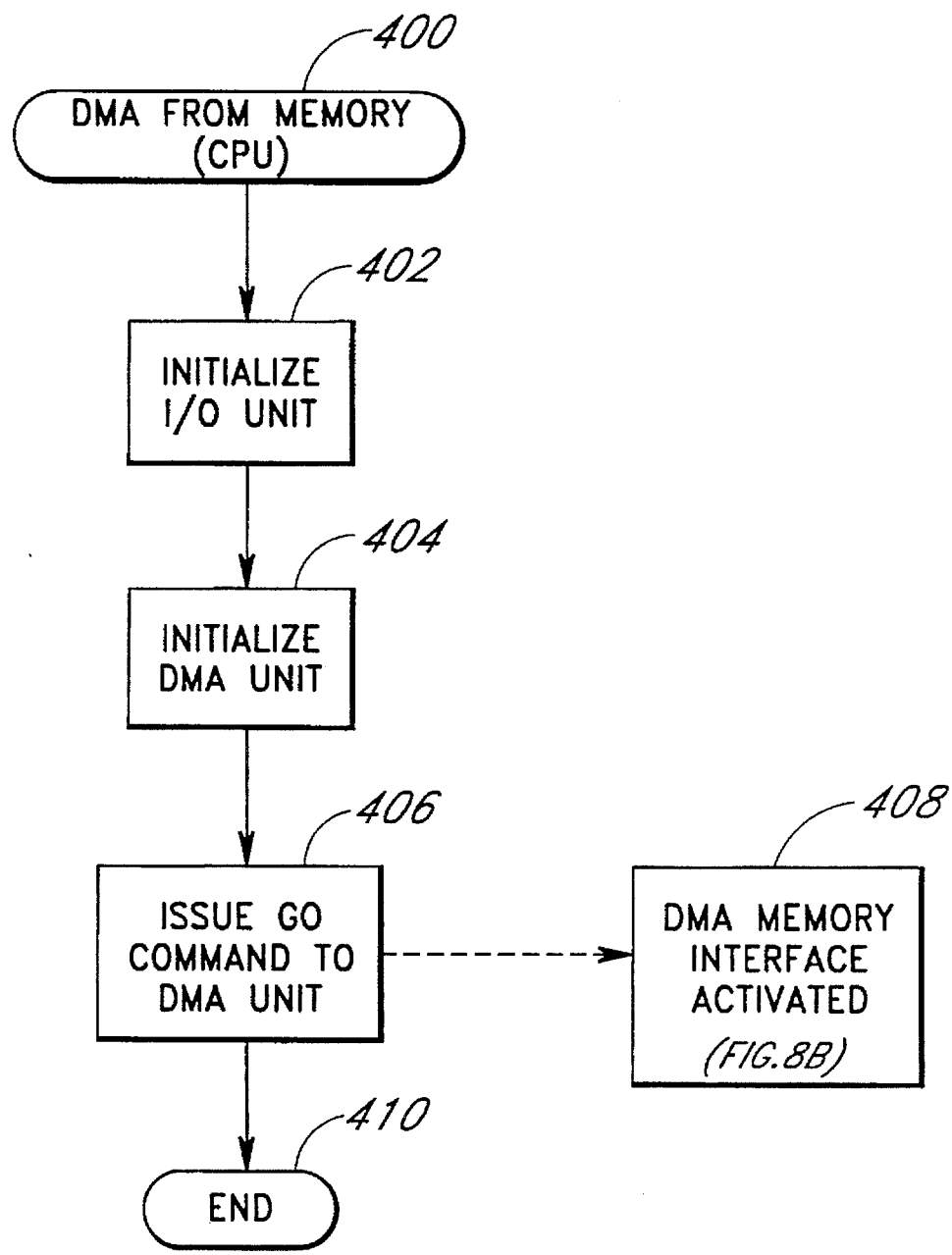
FIG. 8A is a flowchart illustrating the preferred method performed by the CPU of FIG. 1 for executing a DMA transfer from a memory unit to an I/O device.
Figure 8B:
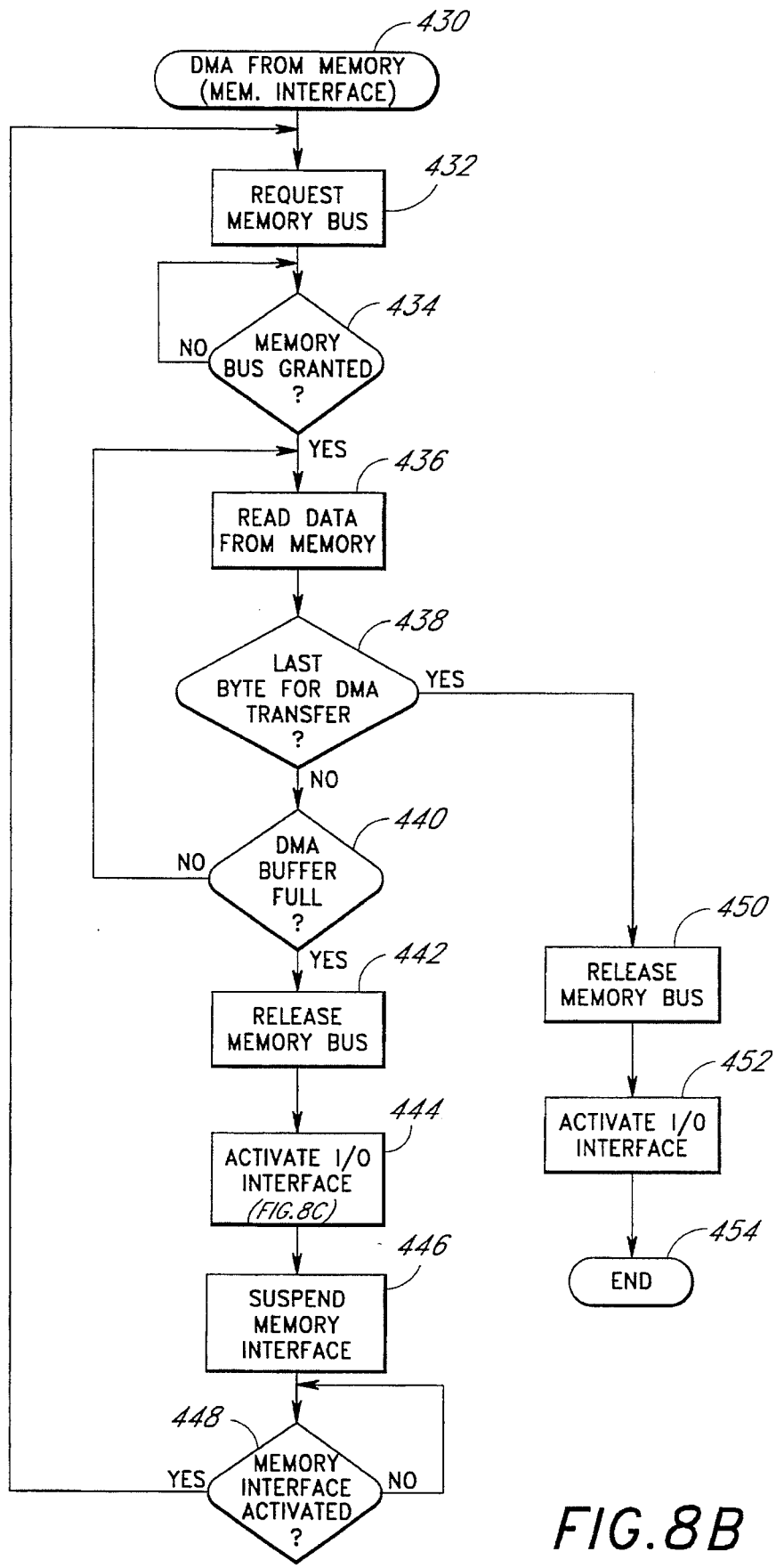
FIG. 8B is a flowchart illustrating the preferred method performed by the memory interface of FIG. 2 for executing a DMA transfer from a memory unit to an I/O device.
Figure 8C:
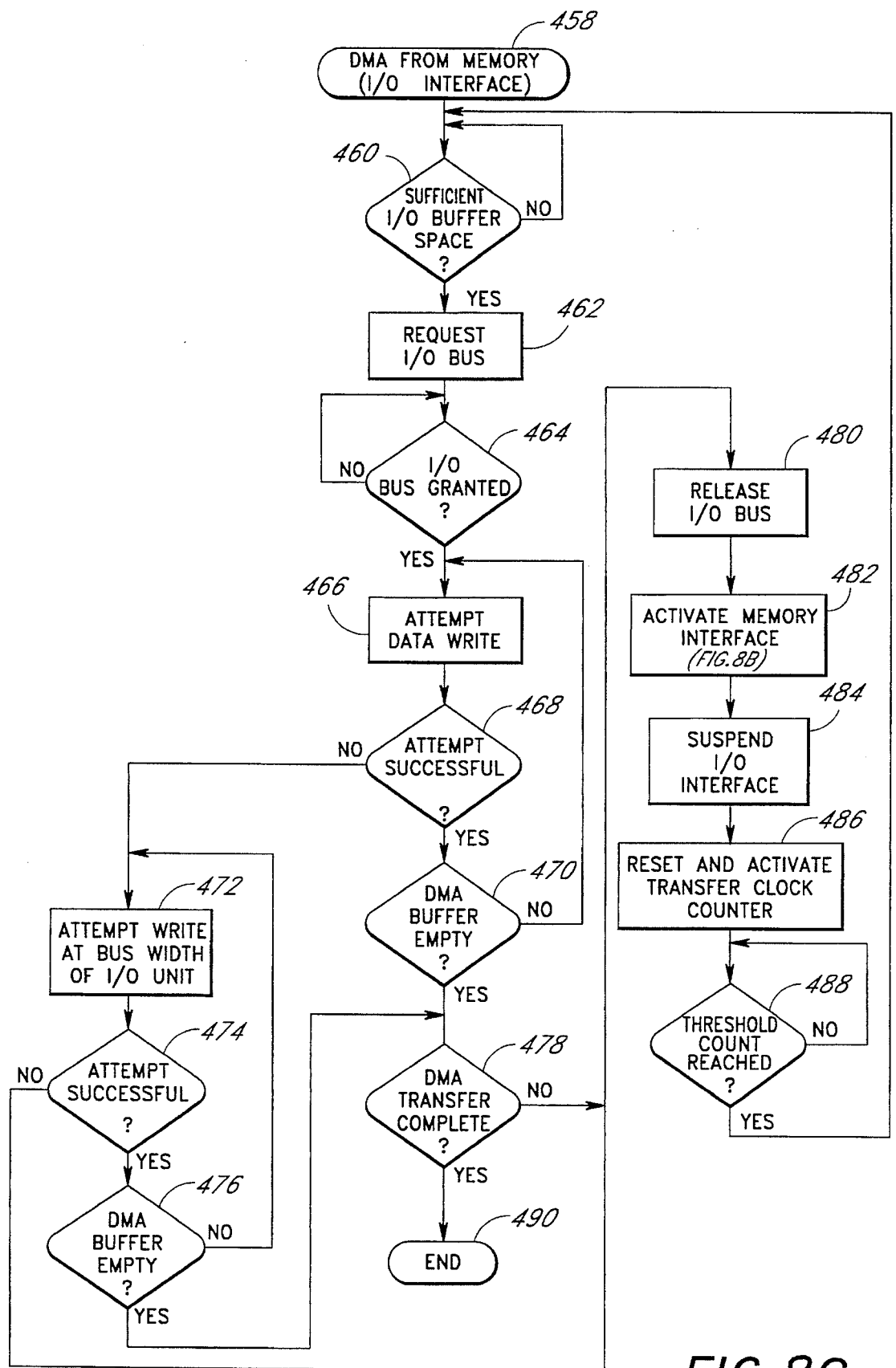
FIG. 8C is a flowchart illustrating the preferred method performed by the I/O interface of FIG. 2 for executing a DMA transfer from a memory unit to an I/O device.
Figure 9A:
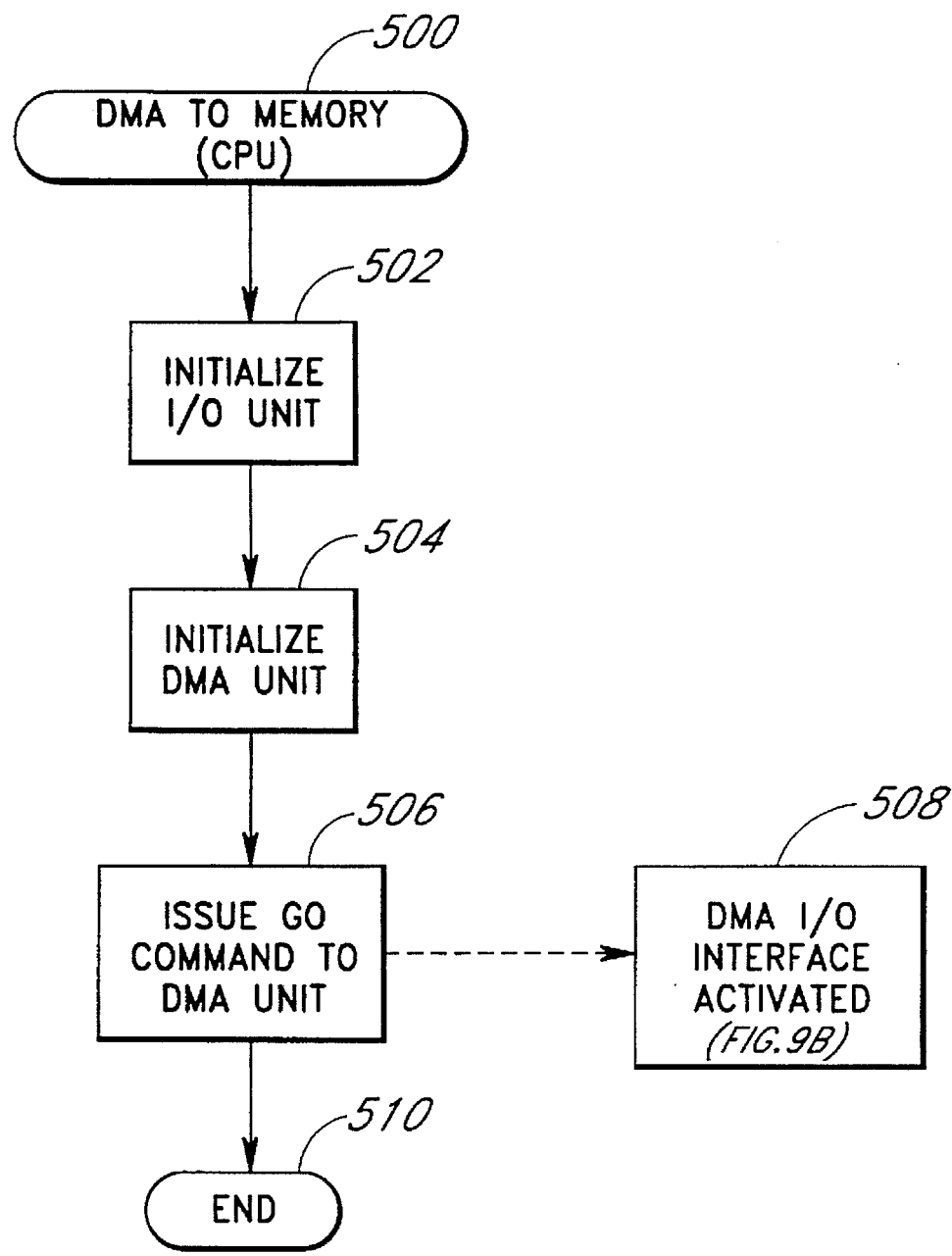
FIG. 9A is a flowchart illustrating the preferred method performed by the CPU of FIG. 1 for executing a DMA transfer from an I/O device to a memory unit.
Figure 9B:
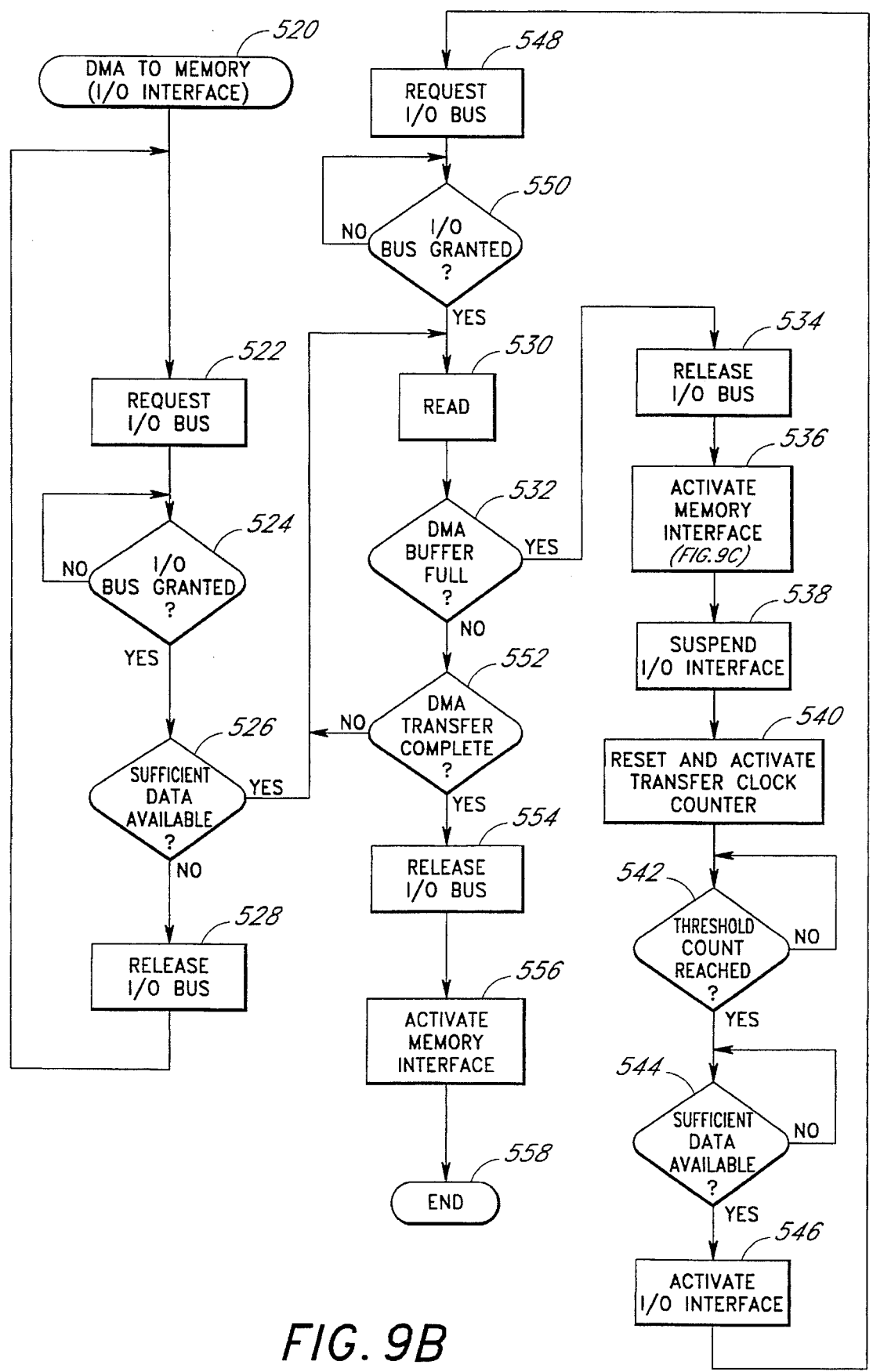
FIG. 9B is a flowchart illustrating the preferred method performed by the I/O interface of FIG. 2 for executing a DMA transfer from an I/O device to a memory unit.
Figure 9C:
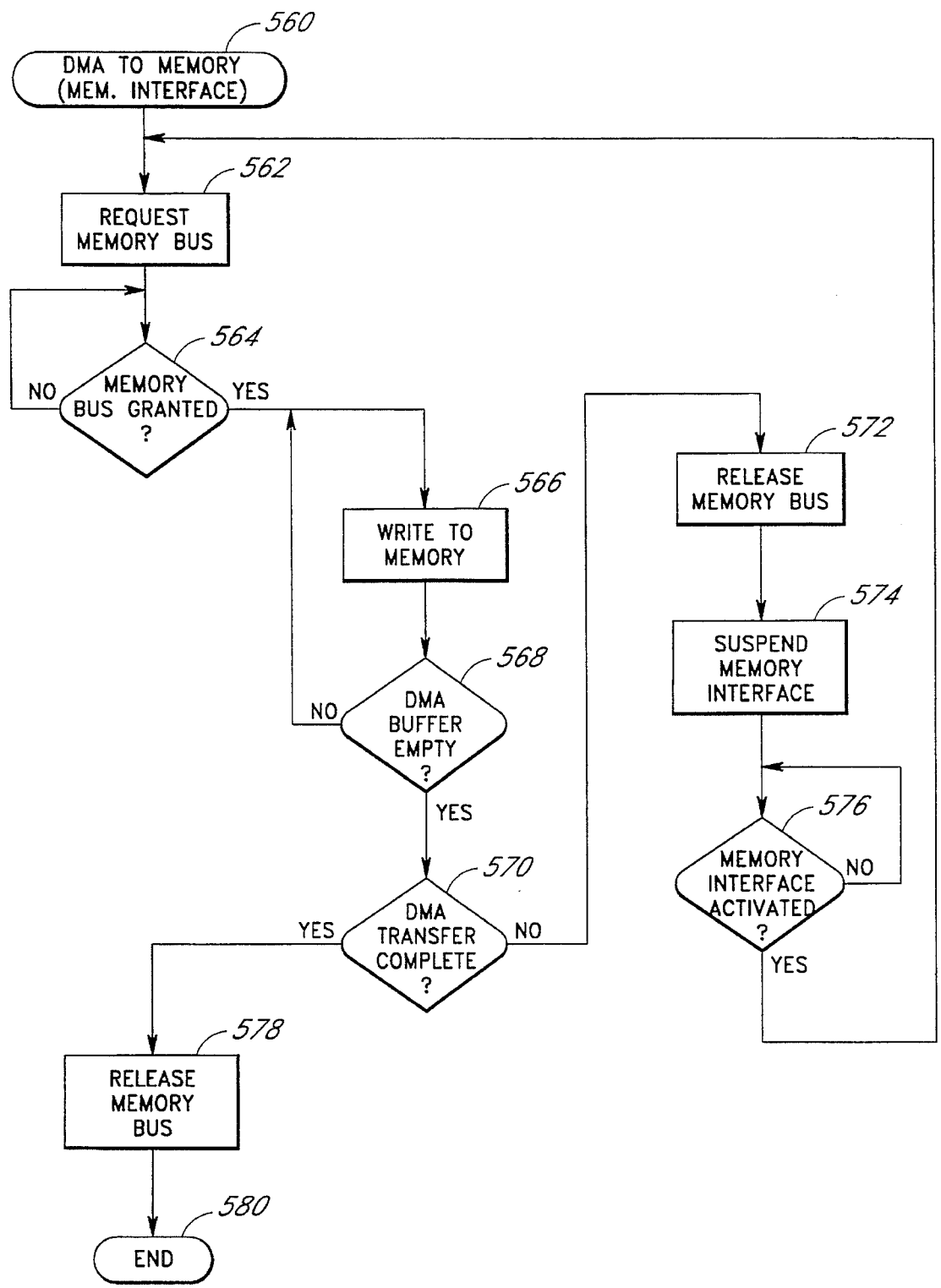
FIG. 9C is a flowchart illustrating the preferred method performed by the memory interface of FIG. 2 for executing a DMA transfer from an I/O device to a memory unit.

FIGS. 8A, 8B, and 8C are flow charts illustrating a method for performing a DMA transfer from the memory unit 120 to an I/O device using the DMA unit 200. FIGS. 9A, 9B, and 9C are flow charts illustrating a method for performing a DMA transfer from an I/O device to the memory unit 120 using the DMA unit 200. FIGS. 8A, 8B, 8C, 9A, 9B, and 9C are described below in relation to DMA transfers between the memory unit 120 and the IDE controller 154. The present description also assumes that the first channel of the DMA unit 200 is programmed for DMA transfers between the memory unit 120 and the IDE controller 154. The method for DMA transfers with other I/O devices on either the primary I/O bus 152 or the secondary I/O bus 182 are similar, although different DMA channels are typically used.

FIG. 8A is a flowchart illustrating a method performed by the CPU 100 to initiate a DMA transfer from the memory unit 120 to the IDE controller 154, using the DMA unit 200.

FIGS. 8B and 8C form a flowchart illustrating the method performed by the DMA unit 200 to execute the DMA transfer between the memory unit 120 and the IDE controller 154.

The method of FIG. 8A begins at an initial block 400. At a process block 402, the CPU 100 initializes the transfer of data to the IDE device 156. The initialization of the data transfer is accomplished by writing a destination address, the size of the DMA transfer, and other control data to the DMA controller 202. The destination address specifies a storage location in the IDE device 156. Within the process block 402, the CPU 100 requests control of the memory bus 110 and the primary I/O bus 152 from the arbiter 153. When the CPU 100 is granted control of the memory bus 110 and the primary I/O bus 152, the CPU 100 executes one or more read/write cycles addressed to the IDE device 156 over the memory bus 110 and the primary I/O bus 152. The IDE device 156 receives destination address information from the primary I/O bus 152 and then waits to receive the data from the DMA transfer.

Within a process block 404, the CPU 100 initializes the DMA unit 200. At this time, the CPU 100 can give up control of the primary I/O bus 152 to allow other I/O transfers to occur on the primary I/O bus 152, but the CPU 100 retains control of the memory bus 110. The CPU 100 performs one or more write cycles addressed to the DMA controller 202 over the memory bus 110 and the DMA controller bus 209. The CPU interface 214 of the DMA controller 202 facilitates the transfer of data, in either direction, between the CPU 100 and the DMA controller 202. Assuming that the DMA controller 202 is not already set up for a DMA transfer over the first DMA channel, the CPU 100 initializes the DMA controller 202 by writing values into the register set A of the first register block 300. Specifically, the CPU 100 writes a source address for the DMA transfer into the source register A 301 and a destination address for the DMA transfer into the destination register A 302. The CPU 100 also writes a value into the count register A 303, indicating the number of bytes to be transferred in the current DMA transfer.

Within a process block 406, the CPU 100 issues a go command to the DMA unit 200. Specifically, the CPU 100 writes a data value to the command register A 304 to set the go bit 304A. When issuing the go command, the CPU 100 writes the appropriate value into the interrupt enable bit 304B and writes the appropriate value into the direction bit 304C to indicate that the data transfer is from memory to the I/O device. The CPU 100 also sets the source register count enable bit 304D to enable the address in the source address register A 301 (FIG. 4) to increment once for each byte of data transferred. The destination register count enable bit 304E is reset so that the destination address register 302 (FIG. 4) does not count in this particular example because the address to the IDE controller does not change. When the go bit 304A is activated in the command register A 304, the memory interface 204 of the DMA controller 202 is activated within a process block 408 in FIG. 8A. The method performed by the memory interface 204 is illustrated in FIG. 8B. After completing the process block 406, the method performed by the CPU 100 during the present DMA transfer ends at a termination block 410.

After setting up the register set A of the first register block 300 for a first DMA transfer, the CPU 100 may proceed to set up DMA transfers in any of the remaining channels, or the CPU 100 may preset the first DMA channel of the DMA unit 200 for a second DMA transfer. To preset the first channel of the DMA unit 200, the CPU 100 again initializes an I/O unit and the DMA unit 200. However, for the preset DMA transfer, the CPU 100 writes appropriate values to register set B of the first register block 300. The CPU 100 can write the appropriate values into the register set B of the first register block 300 while the DMA unit 200 is performing the previously initialized DMA transfer. When the DMA unit 200 completes the first DMA transfer, the contents of the register set B are copied into the register set A to initialize the second DMA transfer. The DMA unit 200 can then proceed with the second DMA transfer. More specifically, the contents of the source register B 306 are copied into the source register A 301, the contents of the destination register B 307 are copied into the destination register A 302, the contents of the count register B 308 are copied into the count register A 303, and the contents of the command register B 309 are copied into the command register A 304. By using the preset registers in this manner, the CPU 100 can control the DMA channel to quickly switch from one block transfer to the next block transfer with minimal delay between the two transfers. Alternatively, rather than copying register set B to register set A, a multiplexer can be provided to select the outputs of either register set A or register set B as the current active outputs.

The DMA controller 202 operates in a manner that is generally similar to a microprocessor running a multitasking operating system. The CPU 100 may start DMA transfers in any or all of the channels of the DMA unit 200. The CPU 100 may also preset any or all of the channels of the DMA unit 200 with subsequent DMA transfers. The DMA controller 202 keeps track of each DMA transfer requested to ensure that each DMA transfer is completed. In the preferred embodiment, an active DMA transfer need not be completed before beginning another DMA transfer. For example, the DMA controller 202 may begin a first DMA transfer by writing a first set of data to the IDE controller 154. Before completing the first DMA transfer, however, the DMA controller 202 may begin a second DMA transfer by reading a second set of data from the SCSI controller 162. The DMA controller 202 may then resume the first DMA transfer by writing a third set of data to the IDE controller 154. The different tasks within the DMA controller 202 that control the different DMA transfers may be given different priority levels according to any of various priority techniques. The priority techniques can grant higher priority to the DMA channels that are associated with I/O devices for which timing is more critical.

As indicated above, FIG. 8B is a flowchart illustrating a method performed by the memory interface 204 during a DMA transfer from the memory unit 120 to the IDE controller 154. The method of FIG. 8B begins with a process block 430. Then, within a process block 432, the memory interface 204 requests control of the memory bus 110 from the arbiter 153. Next, within a decision block 434, the memory interface 204 determines whether the arbiter 153 has granted control of the memory bus 110 to the memory interface 204. If the arbiter 153 has granted control of the memory bus 110 to the memory interface 204, the method of FIG. 8B advances to a process block 436. Otherwise, the method of FIG. 8B returns to the decision block 434.

Within the process block 436, the memory interface 204 generates address and control signals to the memory unit 120 over the memory access bus 124 to read a word of data from the memory unit 120 into the first data buffer 252 of the DMA buffer 250. The word of data from memory comprises a plurality of data bits, the number of which varies in accordance with the memory organization. For example, in preferred embodiments, the memory word may comprise 32 data bits, 64 data bits, 128 data bits, or more. The memory interface 204 begins reading from consecutive addresses within the memory unit 120, beginning at the address specified in the source register A 301.

In a decision block 438, the memory interface 204 determines whether all of the data for the DMA transfer has been read from the memory unit 120 into the first data buffer 252. Specifically, the memory interface 204 counts the number of bytes that are read from the memory interface 204 until the number of bytes reaches the count specified in the count register A 303. If the last byte has been read from the memory unit 120, the method of FIG. 8B advances to a process block 450. Otherwise, the method of FIG. 8B advances to a decision block 440.

In the decision block 440, the memory interface 204 determines whether the first data buffer 252 is full. The DMA controller 202 communicates with the DMA buffer 250 using the DMA control bus 207. If the first data buffer 252 is not full, the method of FIG. 8B returns to the process block 436. Otherwise, the method of FIG. 8B advances to a process block 442.

Within the process block 442, the memory interface 204 releases control of the memory bus 110, and the method then advances to a process block 444. Within the process block 444, the memory interface 204 activates the I/O interface 216. The method performed by the I/O interface 216 during the present DMA transfer is illustrated in more detail in FIG. 8C. The method advances to a process block 446 wherein the memory interface 204 is suspended. The memory interface 204 remains in a state of suspension until it is reactivated by the I/O interface 216. In a decision block 448, the memory interface 204 determines whether it has been reactivated by the I/O interface 216. If the memory interface 204 has not been reactivated, the method of FIG. 8B continues to return to the decision block 448. When the memory interface 204 has been reactivated, the method of FIG. 8B returns to the process block 432, and the steps described above are repeated.

Within the process block 450, the memory interface 204 releases control of the memory bus 110 to the arbiter 153. Thereafter, within a process block 452, the memory interface 204 activates the I/O interface 216. The method of FIG. 8B ends at a terminal block 454.

FIG. 8C is a flowchart illustrating the method performed by the I/O interface 216 during a memory source DMA transfer to transfer data from the memory unit 120 to the IDE controller 154. The method of FIG. 8C begins at an initial block 458. Then, in the decision block 460, the method determines whether there is sufficient I/O space in the write FIFO 602 of the IDE controller 154 to begin a DMA data transfer. If not, the method waits at the decision block 460 until there is sufficient space. If there is sufficient I/O space available, the method proceeds to a process block 462 wherein the I/O interface 216 requests control of the primary I/O bus 152 from the arbiter 153. Then, in a decision block 464, the I/O interface 216 determines whether the arbiter 153 has granted control of the primary I/O bus 152 to the I/O interface 216. If not, the method of FIG. 8C returns to the decision block 464. If the I/O interface 216 has been granted control of the primary I/O bus 152, the method of FIG. 8C advances to a process block 466.

Depending on the specification for the primary I/O bus 152, the I/O interface 216 may only retain control of the primary I/O bus 152 for a specified period of time. For example, as described below, the I/O interface 216 retains control of the primary I/O bus 152 long enough to substantially fill either the write FIFO 602 or the read FIFO 604. The I/O interface 216 then relinquishes control of the primary I/O bus 152. The I/O interface 216 then waits for a second period of time, referred to as the bus acquisition time, before again requesting control of the primary I/O bus 152. The bus acquisition time is specified by either the threshold count from memory register 312 or the threshold count to memory register 313 in accordance with the direction in which data is being transferred between the memory and the I/O device (e.g., the IDE device 156). In the preferred embodiment, the I/O device parameter registers are loaded by the system basic input/output system (BIOS) during system initialization because at that time it will be known which I/O devices are present and which DMA channels are dedicated to particular I/O resources. Thus, the values in the I/O parameter registers are selected to adapt the timing of the DMA transfers to the data transfer characteristics of the I/O device.

Within the process block 466, the I/O interface 216 attempts to write a selected number of bits (e.g., a double word of 32 bits in the case of a 32-bit PCI bus) to the IDE controller 154 over the primary I/O bus 152. The IDE controller 154 indicates whether it is prepared to receive the data by asserting an appropriate signal on the primary I/O bus 152. In particular, the IDE control unit 600 indicates that it cannot receive the data if there is insufficient space in the write FIFO 602.

In a decision block 468, the I/O interface 216 determines whether the attempted write was successful. If the attempted write was successful, the method of FIG. 8C advances to a decision block 470. Otherwise, the method of FIG. 8C advances to a process block 472.

In the decision block 470, the I/O interface 216 determines whether the first data buffer 252 is empty. If the first data buffer 252 is not empty, the method of FIG. 8C returns to the process block 466. If the first data buffer 252 is empty, the method of FIG. 8C advances to a decision block 478.

Within the process block 472, the I/O interface 216 attempts to write data from the first data buffer 252 into the IDE controller 154 at the bus width of the IDE bus 155. The bus width of the IDE bus 155 is specified in the device bus size register 311. As described above, the IDE bus 155 in the embodiment described herein is a 16-bit bus. Thus, the I/O interface 216 attempts to write data (e.g., a word of 16 bits in the described embodiment) into the IDE controller 154. This step is performed in an effort to quickly fill up the write FIFO 602, as there is likely to be either no space in the write FIFO 602 or just enough space for a single word, because data are read out of the write FIFO 602 one 16-bit word at a time.

In a decision block 474, the I/O interface 216 determines whether the attempted write of the process block 472 was successful. If the attempt was successful, the method of FIG. 8C advances to a decision block 476. Otherwise the method of FIG. 8C advances to a process block 480.

In the decision block 476, the I/O interface 216 determines whether the first data buffer 252 is empty. If the first data buffer 252 is not empty, the method of FIG. 8C returns to the process block 472. If the first data buffer 252 is empty, the method of FIG. 8C advances to the decision block 478.

In the decision block 478, the I/O interface 216 determines whether all of the data for the DMA transfer has been transferred from the memory unit 120 to the IDE controller 154. The I/O interface 216 also refers to the count register A 303 to determine whether all of the data has been transferred. If the DMA transfer is complete, the method of FIG. 8C advances to a terminal block 490. Otherwise, the method of FIG. 8C advances to a process block 480. When the DMA transfer is complete, the DMA controller 202 sets the terminal count bit 305A to indicate the completion of the transfer. If the interrupt enable bit 304B is set, the DMA controller 202 also interrupts the CPU 100.

Within the process block 480, the I/O interface 216 releases the primary I/O bus 152 to the arbiter 153. Then, within a process block 482, the I/O interface 216 reactivates the memory interface 204. The memory interface 204 resumes the method of FIG. 8B at the decision block 448. The method then advances to a process block 484 wherein the I/O interface 216 is suspended. Thereafter, in a process block 486, the I/O interface 216 resets the transfer clock counter 316 in the register block 300 to zero and then enables the transfer clock counter 316 to increment. The transfer clock counter 316 increments once per clock cycle of the primary I/O bus 152. The method waits in a decision block 488 until the value in the threshold count from memory register 312 is reached. When the count of the transfer clock counter 316 reaches the value in the threshold count from memory register 312, the method returns to the decision block 460 wherein the I/O interface 216 determines whether there is sufficient space in the write FIFO 602 to resume the DMA transfer. If there is sufficient space, the method proceeds to the process block 462 and resumes the data transfer, as described above. Otherwise, the method waits until the I/O space is available.

The value selected for the threshold count from memory register 312 is dependent on the size of the write FIFO 602 and the speed at which data is removed from the write FIFO 602. The number should be selected to maximize the time during which the I/O interface 216 remains off the primary I/O bus 152, without allowing the write FIFO 602 to become empty. In one embodiment, the number is set at a value that allows the write FIFO 602 to become approximately half empty before the I/O interface 216 resumes the DMA transfer. The time during which the I/O interface 216 does not have control of the primary I/O bus 152 is thus maximized to allow more time for other I/O transfers. On the other hand, it is important not to starve the IDE controller 154 so as not to delay the completion of the DMA transfer.

FIG. 9A is a flowchart illustrating a method performed by the CPU 100 to initiate a DMA transfer from the IDE controller 154 to the memory unit 120, using the DMA unit 200. FIGS. 9B and 9C form a flowchart illustrating the method performed by the DMA unit 200 to execute the DMA transfer between the IDE controller 154 and the memory unit 120.

The method of FIG. 9A begins at an initial block 500. Within a process block 502, the CPU 100 initializes the IDE controller 154. The initialization of the IDE controller 154 is accomplished by writing a source address, the size of the DMA transfer, and other control data to the IDE controller 154. The source address specifies a storage location of the IDE device 156. Within the process block 502, the CPU 100 requests control of the memory bus 110 and the primary I/O bus 152 from the arbiter 153. When the CPU 100 is granted control of the memory bus 110 and the primary I/O bus 152, the CPU 100 executes one or more write cycles addressed to the IDE controller 154 over the memory bus 110 and the primary I/O bus 152. The IDE control unit 600 receives the data from the primary I/O bus 152 and begins to obtain data from the IDE device 156 over the IDE bus 155. The data is loaded into the read FIFO 604.

Next, within a process block 504, the CPU 100 initializes the DMA unit 200. At this time, the CPU 100 can give up control of the primary I/O bus 152 to allow other I/O transfers, but the CPU 100 retains control of the memory bus 110. The CPU 100 performs one or more write cycles addressed to the DMA controller 202 over the memory bus 110 and the DMA controller bus 209. Assuming that the DMA controller 202 is not already set up for a DMA transfer over the first DMA channel, the CPU 100 initializes the DMA controller 202 by writing values into the register set A of the first register block 300. Specifically, the CPU 100 writes a source address for the DMA transfer into the source register A 301 and a destination address for the DMA transfer into the destination register A 302. The CPU 100 also writes a value into the count register A 303, indicating the number of bytes to be transferred in the current DMA transfer.

Next, within a process block 506, the CPU 100 issues a go command to the DMA unit 200. Specifically, the CPU 100 writes a data value to the command register A 304 to set the go bit 304A. When issuing the go command, the CPU 100 also writes the appropriate values into the interrupt enable bit 304B and the direction bit 304C. The CPU 100 sets the destination register count enable bit 304E so that the destination address register 302 increments once for each byte transferred. The CPU 100 resets the source register count enable bit 304D so that the source address register 301 does not increment. When the go bit 304A is activated in the command register A 304, the I/O interface 216 of the DMA controller 202 is activated at a process block 508 in FIG. 9A. The method performed by the I/O interface 216 is illustrated in FIG. 9B. After completing the activities in the process block 506, the method performed by the CPU 100 during the present DMA transfer ends at a termination block 510.

FIG. 9B is a flowchart illustrating a method performed by the I/O interface 216 during a memory destination DMA transfer to transfer data from the IDE controller 154 to the memory unit 120. The method of FIG. 9B begins at an initial block 520. Then, within a process block 522, the I/O interface 216 requests control of the primary I/O bus 152 from the arbiter 153.

Next, in a decision block 524, the I/O interface 216 determines whether the arbiter 153 has granted control of the primary I/O bus 152 to the I/O interface 216. If not, the method of FIG. 9B returns to the decision block 524. If the I/O interface 216 has been granted control of the primary I/O bus 152, the method of FIG. 9B advances to a decision block 526.

In the decision block 526, the I/O interface 216 determines whether sufficient data is available in the read FIFO 604 to begin requesting data from the IDE controller 154 over the primary I/O bus 152. Specifically, the I/O interface 216 accesses a register in the IDE control unit 600 which indicates whether there is sufficient data available. Alternatively, the IDE control unit 600 may assert a signal on the primary I/O bus 152 to indicate that there is sufficient data available.

The amount of data that is considered sufficient is dependent on the size of the read FIFO 604 and the speed at which data is written into the read FIFO 604 from the IDE bus 155. The number should be selected to maximize the time during which the I/O interface 216 remains off the primary I/O bus 152, without allowing the read FIFO 604 to become full. In one embodiment, the amount of data is considered to be sufficient when the read FIFO 604 is half full. In this case, it is important not to allow the read FIFO 604 to fill up so as not to delay the completion of the DMA transfer.

If there is sufficient data available, the method of FIG. 9B proceeds from the decision block 526 to a process block 530.

Otherwise, the method of FIG. 9B proceeds to a process block 528. Within the process block 528, the I/O interface 216 releases the primary I/O bus 152 to the arbiter 153. After completing the activities in the process block 528, the method of FIG. 9B returns to the process block 522.

Within the process block 530, the I/O interface 216 reads data (e.g., 32 bits of data in the described embodiment) from the read FIFO 604 of the IDE controller 154 over the primary I/O bus 152 and then advances to a decision block 532. In the decision block 532, the I/O interface 216 determines whether the first data buffer 252 is full. If the first data buffer 252 is not full, the method of FIG. 9B proceeds to a decision block 552. If the first data buffer 252 is full, the method of FIG. 9B advances to a process block 534.

Within the process block 534, the I/O interface 216 releases the primary I/O bus 152 to the arbiter 153. The method then advances to a process block 536. Within the process block 536, the I/O interface 216 activates the memory interface 204. The method performed by the memory interface 204 is illustrated in FIG. 9C. After activating the memory interface 204, the method advances to a process block 538 wherein the I/O interface 216 is suspended. Then, in a process block 540, the I/O interface 216 resets the transfer clock counter 316 to zero and enables it to increment on occurrence of each clock cycle of the primary I/O bus 152. When the count of the transfer clock counter 316 reaches the value in the threshold count to memory register 313 in a decision block 542, the method then proceeds to a decision block 544 wherein the I/O interface 216 determines whether there is sufficient data available in the read FIFO 604 of the IDE controller 154 to resume the DMA transfer. If there is sufficient data available, the method of FIG. 9B advances to a process block 546. Otherwise, the method of FIG. 9B returns to the decision block 544 to wait until there is sufficient data available.

Although in some embodiments, the value of the threshold count to memory in the register 313 could be selected to be the same value as the threshold count from memory in the register 312, there may be some I/O devices in which data can be transferred to the respective I/O device at a different rate than the data can be transferred from the I/O device. Thus, the preferred embodiment of the present invention provides for independently programmable threshold count values in the registers 312 and 313 to optimize the amount of time when the I/O interface 216 relinquishes the I/O bus 152 for each direction of data transfer.

Within the process block 546, the I/O interface 216 is reactivated. The method of FIG. 9B then enters a process block 548 wherein the I/O interface 216 requests control of the I/O bus 152 from the arbiter 153. Then, in a decision block 550 the I/O interface 216 determines whether the arbiter 153 has granted control of the primary I/O bus 152 to the I/O interface 216. If not, the method of FIG. 9B returns to the decision block 550. If the I/O interface 216 has been granted control of the primary I/O bus 152, the method of FIG. 9B advances to the process block 530 and resumes the DMA transfer as discussed above.

Within the decision block 552, the I/O interface 216 determines whether all of the data for the DMA transfer has been transferred from the IDE controller 154 to the first data buffer 252. The I/O interface 216 refers to the count register A 303 to determine whether all of the data has been transferred. If the DMA transfer is complete, the method of FIG. 9B advances to a process block 554. Otherwise, the method of FIG. 9B returns to the process block 530. Within the process block 554, the I/O interface 216 releases the primary I/O bus 152 to the arbiter 153.

The method then advances to a process block 556, wherein the I/O interface 216 activates the memory interface 204. The method performed by the memory interface 204 during the present DMA transfer is illustrated in FIG. 9C.

The method of FIG. 9B ends at a terminal block 558.

As indicated above, FIG. 9C is a flowchart illustrating a method performed by the memory interface 204 during a DMA transfer from the IDE controller 154 to the memory unit 120. The method of FIG. 9C begins at a process block 560. Then, within a process block 562, the memory interface 204 requests control of the memory bus 110 from the arbiter 153. Next, within a decision block 564, the memory interface 204 determines whether the arbiter 153 has granted control of the memory bus 110 to the memory interface 204. If the arbiter 153 has granted control of the memory bus 110 to the memory interface 204, the method of FIG. 9C advances to a process block 566. Otherwise, the method of FIG. 9C returns to the decision block 564.

Within the process block 566, the memory interface 204 generates address and control signals to the memory unit 120 over the memory access bus 124 to write 32 bits of data from the first data buffer 252 of the DMA buffer 250 to the memory unit 120. The memory interface 204 continues writing data into consecutive addresses within the memory unit 120, beginning at the address specified in the destination register A 302.

After each transfer, the memory interface 204 enters a decision block 568, wherein the memory interface 204 determines whether all of the data for the DMA transfer have been transferred from the first data buffer 252 to the memory unit 120. Specifically, the memory interface 204 counts the number of bytes that have been transferred to the memory interface 204 until the number reaches the count specified in the count register A 303. If the last byte has been transferred from the first data buffer 252 to the memory unit 120, the method of FIG. 9C advances to a decision block 570. Otherwise, the method of FIG. 9C returns to the process block 566 and continues to transfer data from the first data buffer 252 to the memory unit 120.

In the decision block 570, the memory interface 204 determines whether the DMA transfer is complete. In particular, the memory interface 204 determines whether all of the data for the DMA transfer has been transferred to the memory unit 120 from the IDE controller 154. The memory interface 204 refers to the count register A 303 to determine whether all of the data has been transferred. If the DMA transfer is complete, the method of FIG. 9C advances to a process block 578 wherein the memory interface 204 releases control of the memory bus. The method then advances to a terminal block 580.

If, in the decision block 570, the memory interface 204 determines that the DMA transfer is not complete, the method of FIG. 9C advances to a process block 572 wherein the memory interface 204 releases control of the memory bus 110. Then, within a process block 574, the memory interface 204 is suspended. The memory interface 204 remains in a state of suspension until it is reactivated by the I/O interface 216. In a decision block 576, the memory interface 204 determines whether it has been reactivated by the I/O interface 216. If the memory interface 204 has not been reactivated, the method of FIG. 9C returns to the decision block 576. If the memory interface 204 has been reactivated, the method of FIG. 9C returns to the process block 562 and the foregoing steps are repeated until the DMA transfer is complete.

The apparatus and method of the present invention is particularly advantageous in that the DMA transfers fully utilize the speed of the PCI or VESA bus or any other high speed data bus onto which the present invention is implemented. By using the buffers described above, the transfers occur in bursts at the maximum data rate of the bus. When a buffer is empty, the bus is released while the buffer is being filled so that other devices may use the bus. Thus, the rate at which DMA data is transferred on the high speed bus is independent of the rate at which a slow speed I/O device, for example, is able to transfer data. The present invention is also advantageous because it permits multiple DMA devices to share the same bus. By using independent control registers and data buffers, and by releasing the data bus after the data from or to each buffer is transferred, the present invention permits the data transfers from different DMA devices to be interleaved. The bus is more fully utilized, and a lower priority DMA device is provided with full access to the bus.

Although described above in connection with a particular embodiment of the present invention, it should be understood that the description of the embodiment is illustrative of the invention and is not intended to be limiting. Various modifications and applications may occur to those skilled in the art without departing from the true spirit and scope of the invention as defined in the appended claims.

What is claimed is:

1. A direct memory access (DMA) controller for a computer system having a memory coupled to a high speed memory bus and having an I/O device coupled to an I/O bus, said DMA controller comprising:

a first set of independently programmable DMA control registers which identify a first source, a first destination and a first quantity of data to be transferred between said memory and said I/O device via said I/O bus, said first set of DMA control registers being selectable to control a first transfer of data between said memory and said I/O device;

a second set of independently programmable DMA control registers which identify a second source, a second destination and a second quantity of data to be transferred between said memory and said I/O device via said I/O bus, said second set of DMA control registers being selectable to control a second transfer of data between said memory and said I/O device; and a set of device parameter registers which are programmable to specify the data transfer characteristics of said I/O device, wherein said registers in said second set of DMA control registers are programmable while said registers in said first set of DMA control registers are selected to control said first transfer of data between said memory and said I/O device, said second set of DMA control registers being selectable as soon as said first transfer of data is complete to control said second transfer of data between said memory and said I/O device.

2. The DMA controller as defined in claim 1, wherein said device parameter registers comprise:

a first parameter register which specifies a bus size for said I/O device; and a second parameter register which specifies a bus acquisition time for said I/O device, said bus acquisition time determined by the specific data transfer characteristics of said I/O device to maximize an amount of time that said DMA controller relinquishes said I/O bus for other I/O transfers while continuing to transfer data to or from the I/O device.

3. The DMA controller as defined in claim 2, wherein said bus size is the number of data bits that said I/O device transfers in a transfer cycle.

4. The DMA controller as defined in claim 2, wherein:

said DMA controller includes at least one buffer connected to said I/O device to temporarily store data transferred between said memory and said I/O device via said I/O bus;

said DMA controller relinquishes said I/O bus after transferring a burst of data between said buffer and said memory; and said DMA controller delays for said acquisition time before attempting to transfer additional data between said buffer and said memory, wherein said acquisition time is determined by the device parameters of the buffer and is selected to maximize an amount of time that the DMA controller relinquishes said I/O bus for other I/O transfers.

5. The DMA controller as defined in claim 2, wherein said DMA controller includes a first-in/first-out (FIFO) buffer to store a plurality of data bytes transferred between said I/O device and said memory, said DMA controller transferring bursts of data bytes between said FIFO buffer and said memory and then waiting a delay time before transferring further data bytes between said FIFO buffer and said memory, said delay time determined by the device parameters of the FIFO buffer and selected to maximize the time during which the I/O bus is relinquished without allowing the FIFO buffer from becoming empty and without delaying the completion of the DMA transfer, said device parameter registers comprising:

a third parameter register which selects a first predetermined time as said delay time when said DMA controller is transferring data from said I/O device to said memory via said FIFO buffer; and a fourth parameter register which selects a second predetermined time as said delay time when said DMA controller is transferring data from said memory to said I/O device via said FIFO buffer.

6. The DMA controller as defined in claim 1, wherein said DMA controller further comprises:

a first buffer which temporarily stores data transferred from said I/O device to said memory;

a second buffer which temporarily stores data transferred from said memory to said I/O device;

a first parameter register in said set of parameter registers which controls an amount of time during which said DMA controller relinquishes said I/O bus after transferring data from said first buffer to said memory before attempting to transfer additional data from said first buffer to said memory, said amount of time determined by the device parameters of the buffer and selected to maximize an amount of time that the DMA controller relinquishes said I/O bus for other I/O transfers; and a second parameter register in said set of parameter registers which controls an amount of time during which said DMA controller relinquishes said I/O bus after transferring data to said second buffer from said memory before attempting to transfer additional data to said second buffer from said memory, said amount of time determined by the device parameters of the buffer and selected to maximize an amount of time that the DMA controller relinquishes said I/O bus for other I/O transfers.

7. A direct memory access (DMA) system for a computer system having a memory coupled to a high speed memory bus and having an I/O device coupled to an I/O bus, said DMA system comprising:

a first data buffer which transfers data to and from memory at a first data rate of said high speed memory bus;

a second data buffer which transfers data to and from said I/O device at a second data rate of said I/O device;

a DMA controller which controls transfers of data between said first data buffer and said second data buffer via said I/O bus, said DMA controller transferring data between said first data buffer and said second data buffer as bursts of data at a high data rate and then releasing said I/O bus while data is transferred between second data buffer and said I/O device at said second data rate.

8. A method for performing a direct memory access data transfer from a memory device to a second device in a microprocessor-based computer system, said method comprising the steps of:

transferring data from said memory device into a first data buffer until said first data buffer is full or until all of the data for the data transfer has been transferred from said memory device to said first data buffer;

waiting until a predetermined number of data bytes has been read from said second data buffer of said second device, wherein said predetermined number of data bytes depends on the size of the buffer and is selected to maximize an amount of time during which the I/O bus is released;

transferring data from said first data buffer to a second data buffer associated with said second device until said second data buffer is full;

transferring data from said second data buffer to said second device; and repeatedly performing the following steps until all of the data for the data transfer has been transferred to the second device:

transferring data from said memory device into said first data buffer until said first data buffer is full or until all of the data for the data transfer has been transferred from the memory device to said first data buffer;

waiting until a predetermined number of data bytes has been read from said second data buffer of said second device;

transferring data from said first data buffer to said second data buffer until said second data buffer is full or until all of the data for the data transfer has been transferred to said second data buffer; and transferring data from said second data buffer to said second device until said second data buffer is empty or until all of the data from the data transfer has been transferred to said second device.

9. A method for performing a direct memory access data transfer to a memory device from a second device in a microprocessor-based computer system, said method comprising the steps of:

transferring data from said second device to a first data buffer associated with said second device;

waiting until a predetermined number of data bytes has been written into said first data buffer, wherein said predetermined number of data bytes depends on the size of the buffer and is selected to maximize an amount of time during which the I/O bus is released;

transferring data from said first data buffer to a second data buffer until the second data buffer is full or until all of the data for the data transfer has been transferred from said second device;

transferring data from said second data buffer to said memory device until said second data buffer is empty; and repeatedly performing the following steps until all of the data for the data transfer has been transferred to said memory device;

waiting until said predetermined number of data bytes has been written into said first data buffer from said second device;

transferring data from said first data buffer to said second data buffer until said second data buffer is full or until all of the data for the data transfer has been transferred from the second device; and transferring data from said second data buffer to said memory device until said second data buffer is empty.

10. A direct memory access (DMA) system for a computer system having a memory, an I/O interface and a plurality of I/O devices, said DMA system comprising:

a DMA controller connected between said memory and said I/O interface, said DMA controller comprising:

a first set of independently programmable DMA control registers which control transfers of data between said memory and a first I/O device of said plurality of I/O devices, wherein said first set of DMA control registers comprise a plurality of control registers including a first register which selects a source of data to be transferred, a second register which selects a destination for said data to be transferred and a third register which selects an amount of data to be transferred between memory and said first I/O device via said I/O bus; and a second set of independently programmable DMA control registers which control transfers of data between said memory and a second I/O device of said plurality of I/O devices, wherein said second set of DMA control registers comprise a plurality of control registers including a fourth register which selects a source of data to be transferred, a fifth register which selects a destination for said data to be transferred and a sixth register which selects an amount of data to be transferred between memory and said first I/O device via said I/O bus;

at least two sets of device parameter registers which are programmable to specify the data transfer characteristics of each I/O device of said plurality of I/O devices; and a DMA buffer connected between said memory and said I/O interface, said DMA buffer comprising:

a first data buffer which temporarily stores said data to be transferred between said memory and said first I/O device; and a second data buffer which temporarily stores said data to be transferred between said memory and said second I/O device, said DMA controller controlling said first set of DMA control registers and said first data buffer independently of said second set of DMA control registers and said second data buffer so that data transferred between said memory and said first I/O device is interleaved with data transferred between said memory and said second I/O device.

11. The DMA system as defined in claim 10, wherein said first set of control registers further includes a command register, said command register controlled by said computer system, said DMA system responsive to data stored in said command register to initiate a data transfer, said DMA system further responsive to data stored in said command register to selectively generate an interrupt to said computer system when said data transfer is completed.

12. A direct memory access (DMA) system for a computer system having a memory, an I/O interface and a plurality of I/O devices, said DMA system comprising:

a DMA controller connected between said memory and said I/O interface, said DMA controller comprising:

a first set of DMA control registers which control transfers of data between said memory and a first I/O device of said plurality of I/O devices;

a second set of DMA control registers which control transfers of data between said memory and a second I/O device of said plurality of I/O devices; and a third set of DMA control registers, said third set of DMA control registers being loadable with control information while said DMA system is operating under control of said first set of DMA control registers, said control information from said third set of DMA control registers being transferred to said first set of DMA control registers to replace information in said first set of DMA control registers so that said DMA system begins operating under control of said information from said third set of DMA control registers and a DMA buffer connected between said memory and said I/O interface, said DMA buffer comprising:

a first data buffer which temporarily stores said data to be transferred between said memory and said first I/O device; and a second data buffer which temporarily stores said data to be transferred between said memory and said second I/O device, said DMA controller controlling said first set of DMA control registers and said first data buffer independently of said second set of DMA control registers and said second data buffer so that data transferred between said memory and said first I/O device is interleaved with data transferred between said memory and said second I/O device.

* * * * *